(12) United States Patent
Sumi et al.

(10) Patent No.: US 6,891,557 B2
(45) Date of Patent: May 10, 2005

(54) THERMAL DEVELOPING IMAGE FORMING APPARATUS AND METHOD FOR PHOTOTHERMOGRAPHIC IMAGING MATERIAL

(75) Inventors: Makoto Sumi, Hachioji (JP); Akira Taguchi, Hachioji (JP); Takehiro Shiraishi, Hachioji (JP); Masaya Shimoji, Hachioji (JP); Mamoru Umeki, Hachioji (JP); Makoto Horiuchi, Hachioji (JP)

(73) Assignee: Konica Corporation, Tokyo (JP)

(*) Notice: Subject to any disclaimer, the term of this patent is extended or adjusted under 35 U.S.C. 154(b) by 22 days.

(21) Appl. No.: 10/327,203

(22) Filed: Dec. 24, 2002

(65) Prior Publication Data

US 2003/0118926 A1 Jun. 26, 2003

(30) Foreign Application Priority Data

Dec. 26, 2001 (JP) .................................... 2001-393503
Dec. 27, 2001 (JP) .................................... 2001-397284
Mar. 27, 2002 (JP) .................................... 2002-089038

(51) Int. Cl.$^7$ .............................. B41J 2/435; G03C 5/16
(52) U.S. Cl. ...................................... 347/228; 430/350
(58) Field of Search ................................. 347/133, 139, 347/140, 155, 228, 212, 156; 430/30, 328, 350; 355/227, 30; 399/72

(56) References Cited

U.S. PATENT DOCUMENTS

| | | | |
|---|---|---|---|
| 4,275,959 A | 6/1981 | Jones | ........................... 355/20 |
| 5,130,743 A | 7/1992 | Katoh et al. | ................. 355/405 |
| 5,414,488 A * | 5/1995 | Fujita et al. | ................... 355/30 |
| 5,580,478 A * | 12/1996 | Tanamachi et al. | ......... 219/502 |
| 5,826,139 A * | 10/1998 | Nacman et al. | ................ 399/72 |
| 6,114,660 A * | 9/2000 | Donaldson et al. | ......... 219/216 |
| 6,137,563 A | 10/2000 | Agano | ......................... 355/405 |
| 6,262,756 B1 | 7/2001 | Kashino et al. | .............. 347/215 |
| 6,285,386 B1 | 9/2001 | Suzuki | ........................ 347/155 |
| 6,287,024 B1 * | 9/2001 | Furukawa | .................... 396/571 |
| 6,320,642 B1 * | 11/2001 | Ogawa et al. | ................. 355/27 |

FOREIGN PATENT DOCUMENTS

| | | | |
|---|---|---|---|
| EP | 0 353 105 A2 | 1/1990 | |
| EP | 0 373 932 A2 | 6/1990 | |
| EP | 1 152 293 A2 | 11/2001 | |
| JP | 63094246 A * | 4/1988 | .......... G03D/13/00 |
| JP | 2000-347311 | 12/2000 | |

* cited by examiner

Primary Examiner—Hai Pham
(74) Attorney, Agent, or Firm—Finnegan, Henderson, Farabow, Garrett & Dunner, L.L.P.

(57) ABSTRACT

An image forming apparatus includes an exposure portion having a light source, for forming a latent image on a photothermographic imaging material by exposing a light beam, a thermal development portion having a heating portion for thermally developing by heating the photothermographic imaging material on which the latent image is formed, and a cooling and conveying portion for conveying and cooling the thermally developed photothermographic imaging material, a temperature detecting member for detecting at least one of a temperature of a predetermined portion concerning the cooling and conveying portion, and a temperature in a vicinity of the exposure portion, and a control unit for controlling a factor relating to thermal development on a basis of the temperature detected by the temperature detecting member.

34 Claims, 14 Drawing Sheets

THERMAL DEVELOPING IMAGE FORMING APPARATUS AND METHOD FOR PHOTOTHERMOGRAPHIC IMAGING MATERIAL

BACKGROUND OF THE INVENTION

1. Field of the Invention

The present invention relates to an image forming apparatus and method that employ thermal development type, for forming an image on a photothermographic imaging material by thermal development.

2. Description of Related Art

A laser imager used in medical field is known as an example of an image forming apparatus. The laser imager is an apparatus for visualizing a latent image by performing development after exposing laser on a film as a phototmermographic imaging material, on a surface of which a photosensitive agent is formed. The laser imager is capable of outputting an image of high resolution and high gradation compared to the display by a display, such as CRT, or the printout to a paper by a copying machine. Therefore, it is well used in the medical field. For example, a laser imager is used for visualizing output data of an X-ray CT apparatus (X-ray computed tomography apparatus), an NMR (nuclear magnetic resonance apparatus), an ultrasonic wave CT apparatus (ultrasonic wave computed tomography) or the like.

After a laser beam is modulated by a light modulation element, it is irradiated on the film by being scanned. The exposed film is developed by heat or developing solution. Thereby, an image is visualized on the film. Since the light modulation element modulates the laser beam in accordance with the output data of the X-ray CT apparatus or the like, the output data is visualized on the film.

There are wet type and dry type in development types. However, the dry type has been increasing because of its easiness in handling. In case of using the dry type, thermal development type for heating the exposed film by a thermal development drum is employed in many cases.

In thermal development, the development amount (finished density) is determined by how much time the film is kept at not less than a critical temperature at which thermal development reaction is caused. Therefore, in the image forming apparatus for performing thermal development, the heating temperature or the development time at the time of development is an extremely important factor in order to maintain the finishing of the photothermographic imaging material well. In particular, in the image forming apparatus of high gradation and high resolution, such as a laser imager or the like, the effect of the variation in development amount on the finishing of the film is comparatively large.

The apparatus in Japanese Patent Laid-Open Publication No. 2000-347311 is an example of an image forming apparatus that employs thermal development type. The image forming apparatus comprises a feeding portion for feeding films as sheet-like photothermographic imaging materials one by one, an exposure portion for exposing the fed film, and a thermal development portion for thermally developing and cooling the exposed film.

The exposure portion is provided at the lower portion in the housing of the image forming apparatus. The exposure portion irradiates a laser beam in a range of 780 to 860 nm of infrared region on the photosensitive surface of the film in a horizontal direction so as to scan and expose the film, so that a latent image in accordance with the exposing image signal is formed.

Further, the thermal development portion having a heating portion and a cooling and conveying portion is provided on the upper portion of the image forming apparatus. The heating portion comprises a thermal development drum having a built-in heat source, and facing rollers for conveying the film on the thermal development drum. In the heating portion, the thermal development drum heats and thermally develops the film while the film and the outer circumferential surface of the thermal development drum are rotated to the conveying direction together in a state of being in close contact with each other. Thereby, the latent image of the film is formed to be a visible image.

In the latter step of the heating portion, a plurality of conveying roller pairs are provided, and the cooling and conveying portion for conveying and cooling the film separated from the thermal development drum is provided. Then, the conveying roller pairs convey the cooled film in the cooling and conveying portion, and the film is outputted to a film outputting portion provided, for example, on the upper portion of the image forming apparatus.

However, in the image forming apparatus in earlier technology, it is required to control the heating temperature of the thermal development drum in the heating portion uniformly in order to make the image density on the film after developed uniform. However, it is insufficient just to control the heating temperature of the thermal development drum. There are some problems as follows.

That is, in such an image forming apparatus, when the film is thermally developed continuously, temperature variation in the thermal development portion of the image forming apparatus, such as temperature decrease of the facing rollers according to the heat being taken away by the film, temperature increase of the cooling and conveying portion according to the heat supply from the heated film, or the like, is caused.

According to such an effect of temperature variation in the thermal development portion, temperature difference in processing is caused for every film processed continuously. As a result, predetermined density characteristics cannot be obtained in the film after developed, so that density difference in development is caused.

As a measure for this problem, an image forming apparatus for performing development of a predetermined density, comprising a feedback mechanism for adjusting the development density by measuring the density of the film after developed and performing adjustment of the intensity of exposure in the exposure portion or adjustment of the heating amount in the thermal development portion according to the measured density.

However, the cost of such an image forming apparatus comprising a feedback mechanism for adjusting the development density on the basis of measured density increases since the members constituting the apparatus increase. Moreover, there is a problem that the apparatus itself becomes complicated.

Further, the thermal development drum in the heating portion is the heat source for heating directly the film, and is the portion which affects the image density after development most. However, at the time of exposure in the exposure portion, the temperatures in the inside and in the vicinity of the exposure portion vary because of the installation environment including winter, summer, air conditioning or the like. Thereby, the wavelength of the semiconductor laser having temperature dependency varies, so that the intensity of beam over the photosensitive wavelength region that the film receives varies substantially. Therefore, already different density of latent image becomes to be formed. Accordingly, the finished density also varies even though the thermal development portion is in constant condition. Thus, the effect of the temperature of the exposure portion also increases.

SUMMARY OF THE INVENTION

An object of the present invention is to provide an image forming apparatus and method that employ thermal development type, for obtaining stable image density by controlling factors that effects development density of a photothermographic imaging material.

Further, another object of the present invention is to provide an image forming apparatus and method that employ thermal development type, which comprises comparatively cheaply functions for preventing density difference in thermal development of every continuously processed photothermographic imaging material according to temperature difference in processing from being caused comparatively cheaply.

In order to achieve the above-described object, according to a first aspect of the present invention, the image forming apparatus comprises: an exposure portion having a light source, for forming a latent image on a photothermographic imaging material by exposing a light beam to the photothermographic imaging material from the light source; a thermal development portion having a heating portion for thermally developing the photothermographic imaging material on which the latent image is formed, by heating, and a cooling and conveying portion for conveying and cooling the thermally developed photothermographic imaging material; a temperature detecting member for detecting at least one of a temperature of a predetermined portion in the thermal development portion and a temperature in a vicinity of the exposure portion; and a control unit for controlling a factor relating to thermal development on a basis of the temperature detected by the temperature detecting member.

According to the image forming apparatus of the present invention, since the factor relating to thermal development can be controlled apropriately in accordance with the temperature of a predetermined portion in the thermal development portion, the image density of the thermally developed photothermographic imaging material can be controlled with sufficient accuracy. Therefore, even though the temperature in the apparatus varies, the image density of the photothermographic imaging material can be obtained stably.

Here, the "factor relating to thermal development" in the present specification means the factor which effects the image density of the photothermographic imaging material, and includes start and stop of the operation of the whole image forming apparatus that employs thermal development type. Since the image density of the photothermographic imaging material is determined by the total thermal mass given to the photothermographic imaging material within a predetermined time, the factor relating to thermal development is preferable to include at least one of a development time and a development temperature in the thermal development portion. The development time may be a heating time for heating the photothermographic imaging material in the heating portion, for example, the conveying speed of the photothermographic imaging material in the heating portion, and the development temperature may be a heating temperature for heating the photothermographic imaging material in the heating portion, for example, the electric power given to the heating portion.

Moreover, the control unit may make an operation stop when the temperature detected by the temperature detecting member is outside of a predetermined range. Thereby, the thermal development processing operation can be made to stop for an appropriate time corresponding to the temperature variation. That is, the thermal development processing can be performed only in the temperature range suitable for thermal development processing. Therefore, the image density of the thermally developed photothermographic imaging material can be made to be stable within a predetermined range. Then, the control unit may make the operation restart when the temperature is within the predetermined range or when a time that the operation is stopped exceeds a predetermined time.

According to the image forming apparatus, since the control of carrying out or stopping of the thermal development processing operation in the thermal development portion is performed on the basis of the temperature of a predetermined portion in the thermal development portion detected by the temperature detecting member, the temperature variation in the image forming apparatus according to continuous processing can be suppressed within a predetermined range, and the density difference of the thermally developed photothermographic imaging material can be suppressed within a predetermined range. That is, the density of the photothermographic imaging material thermally developed within a range of processing ability of the image forming apparatus can be made stable. In addition, since the problem of the density difference in thermal development according to the temperature difference in processing can be solved by the control on the basis of the temperature detecting member detecting the temperature of a predetermined portion in the thermal development portion, an image forming apparatus cheaper than the image forming apparatus in earlier technology that comprises a feedback mechanism for adjusting development density can be provided.

Moreover, the image forming apparatus may further comprise a detecting member for detecting a quantitative processing history of the photothermographic imaging material thermally developed in the thermal development portion. In this case, the control unit is preferable to control the factor relating to thermal development on a basis of the temperature detected by the temperature detecting member and the quantitative processing history detected by the detecting member. The control unit may make an operation stop when the quantitative processing history exceeds a predetermined quantity. Then, the control unit is preferable to control at least one of a development time and a development temperature in the thermal development portion until the quantitative processing history reaches the predetermined quantity. Further, the control unit may make the operation restart when a time that the operation is stopped exceeds a predetermined time or when the temperature detected by the temperature detecting member is within a predetermined range. Here, the temperature detected by the temperature detecting member is preferable to be a temperature in the cooling and conveying portion.

Further, according to a second aspect of the present invention, the image forming method comprises: forming a latent image on a photothermographic imaging material by exposing a light beam to the photothermographic imaging material from a light source; thermal development including heating for thermally developing the photothermographic imaging material on which the latent image is formed, by heating, and cooling and conveying for conveying and cooling the thermally developed photothermographic imaging material; detecting at least one of a temperature in the thermal development and a temperature in the forming the latent image; and controlling a factor relating to thermal development on a basis of the detected temperature.

According to the image forming method, the factor relating to thermal development can be controlled appropriately in accordance with the temperature in the thermal development or the tempereture in the forming the latent image, the image density of the thermally developed photothermographic imaging material can be controlled with sufficient accuracy. Therefore, even though the temperature in the apparatus to which the method is applied varies, the image density of the photothermographic imaging material can be obtained stably.

Further, the factor relating to thermal development is preferable to include at least one of a development time and a development temperature in the thermal development. The development time may be a heating time for heating the photothermographic imaging material in the heating, and the development temperature may be a heating temperature for heating the photothermographic imaging material in the heating.

The controlling may include stopping an operation when the detected temperature is outside of a predetermined range. Then, the operation may be restarted in the controlling when the temperature is within the predetermined range or when a time that the operation is stopped exceeds a predetermined time.

Moreover, the image forming method may further comprise detecting a quantitative processing history of the photothermographic imaging material thermally developed in the thermal development. In this case, the controlling is preferable to include controlling the factor relating to thermal development on a basis of the detected temperature and the detected quantitative processing history. The controlling may include stopping an operation when the quantitative processing history exceeds a predetermined quantity. Then, the controlling is preferable to include controlling at least one of a development time and a development temperature in the thermal development until the quantitative processing history reaches the predetermined quantity. Further, the controlling may include restarting the operation when a time that the operation is stopped exceeds a predetermined time or when the detected temperature is within a predetermined range. Here, the detected temperature is preferable to be a temperature in the cooling and conveying.

Moreover, according to a third aspect of the present invention, the image forming apparatus comprises: an exposure portion having a light source, for forming a latent image on a photothermographic imaging material by exposing a light beam to the photothermographic imaging material from the light source; a thermal development portion having a heating portion for thermally developing the photothermographic imaging material on which the latent image is formed, by heating, and a cooling and conveying portion for conveying and cooling the thermally developed photothermographic imaging material; a detecting member for detecting a quantitative processing history of the photothermographic imaging material thermally developed in the thermal development portion; and a control unit for controlling a factor relating to thermal development on a basis of the quantitative processing history detected by the detecting member.

According to the image forming apparatus of the present invention, since the problem of density difference in thermal development according to the temperature difference in processing by controlling the factor relating to thermal development only by the detecting member for detecting the quantitative processing history of the photothermographic imaging material for being thermally developed can be solved, an image forming apparatus cheaper than the image forming apparatus in earlier technology that comprises a feedback mechanism for adjusting development density can be provided.

Here, the "quantitative processing history" in the present specification is about the quantity (number of sheets) of the thermally developed photothermographic imaging material. It may be the size, the processing area according to the size and the number of sheets, or the like of the photothermographic imaging material.

Further, in the image forming apparatus, the control unit is preferable to make an operation stop when the quantitative processing history exceeds a predetermined quantity. Then, the control unit may make the operation restart when a time that the operation is stopped exceeds a predetermined time. Further, the image forming apparatus may further comprise a temperature detecting member for detecting at least one of a temperature of a predetermined portion in the thermal development portion and a temperature in a vicinity of the exposure portion.

According to the image forming apparatus, since the thermal development processing operation in the thermal development portion can be made to stop in accordance with the quantitative processing history of the photothermographic imaging material for being thermally developed that is detected by the detecting member, not less than a predetermined processing quantity of photothermographic imaging materials cannot be processed continuously on the basis of the processing history. Thereby, the temperature variation in the image forming apparatus according to continuous processing can be suppressed within a predetermined range, and the density difference of the thermally developed photothermographic imaging material can be suppressed within a predetermined range. That is, the density of the photothermographic imaging material thermally developed within a range of processing ability of the image forming apparatus can be made to be stable.

Further, according to a fourth aspect of the present invention, the image forming method of the present invention comprises: forming a latent image on a photothermographic imaging material by exposing a light beam to the photothermographic imaging material from the light source; thermal development including heating for thermally developing the photothermographic imaging material on which the latent image is formed, by heating, and a cooling and conveying for conveying and cooling the thermally developed photothermographic imaging material; detecting a quantitative processing history of the photothermographic imaging material thermally developed in the thermal development portion; and controlling a factor relating to thermal development on a basis of the detected quantitative processing history.

According to the image forming method of the present invention, since the problem of density difference in thermal development according to temperature difference in processing by controlling the factor relating to thermal development only by detecting the quantitative processing history of the photothermographic imaging material for being thermally developed can be solved, an image forming method cheaper than the image forming method in earlier technology that comprises a feedback mechanism for adjusting development density can be provided.

The controlling is preferable to include stopping an operation when the quantitative processing history exceeds a predetermined quantity, and the controlling may include restarting the operation when a time that the operation is stopped exceeds a predetermined time.

Further, the image forming method is preferable to further comprise detecting at least one of a temperature in the thermal development and a temperature in the forming the latent image.

Moreover, in the above-mentioned image forming apparatus and method, the light source is preferable to be one of a semiconductor laser and a light emitting diode.

Further, in the above-mentioned image forming apparatus, preferably, the cooling and conveying portion comprises a guiding member for guiding the photothermographic imaging material, and the temperature of the predetermined portion in the thermal development portion is one of a temperature of the thermally developed photothermographic imaging material, an atmospheric temperature in the cooling and conveying portion, a temperature of the guiding member in the cooling and conveying portion, and an atmospheric temperature between the heating portion and the cooling and conveying portion, and the temperature in the vicinity of the exposure portion is one of an atmospheric temperature in the vicinity of the exposure portion and a temperature of a member in the vicinity of the luminescent light source, such as a laser diode or the like. Moreover, in the above-mentioned image forming method, preferably, the thermally developed photothermographic imaging material is conveyed by a guiding member and the exposure is carried out by an exposure portion, and the temperature in the thermal development is one of a temperature of the thermally developed photothermographic imaging material, an atmospheric temperature in the cooling and conveying, a temperature of the guiding member, and an atmospheric temperature between the heating and the cooling and conveying, and the temperature in the forming the latent image is one of an atmospheric temperature in a vicinity of the exposure portion, a temperature of a member in the vicinity of the exposure portion, and a temperature of a member in the vicinity of the luminescent light source, such as a laser diode or the like. Here, a heat insulation member may be provided on the guiding surface of the guiding member that is for guiding the photothermographic imaging material.

Moreover, in the above-mentioned image forming apparatus, preferably, the thermal development portion further comprises an air blowing member for cooling an inside of the thermal development portion by cooling air. In this case, the air blowing member is preferable to cool an inside of the thermal development portion by cooling air when the operation is stopped. Thereby, since the cooling air does not cool directly the photothermographic imaging material, the thermal development portion can be cooled without affecting directly the photothermographic imaging material. Therefore, the density of the thermally developed photothermographic imaging material can be made to be more stable. Further, the thermal development portion may further comprise a deodorizing member for removing gas generated when the photothermographic imaging material is thermally developed. Further, the above-mentioned image forming method is preferable to further comprise blowing cooling air for cooling a temperature in the thermal development. The cooling is preferable to be performed when the operation is stopped. Further, the image forming method may further comprise removing gas generated when the photothermographic imaging material is thermally developed.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

PREFERRED EMBODIMENT OF THE INVENTION

Hereinafter, embodiments of the present invention will be explained in detail with reference to FIGS. 1 to 14.

[First Embodiment]

Figure 1:
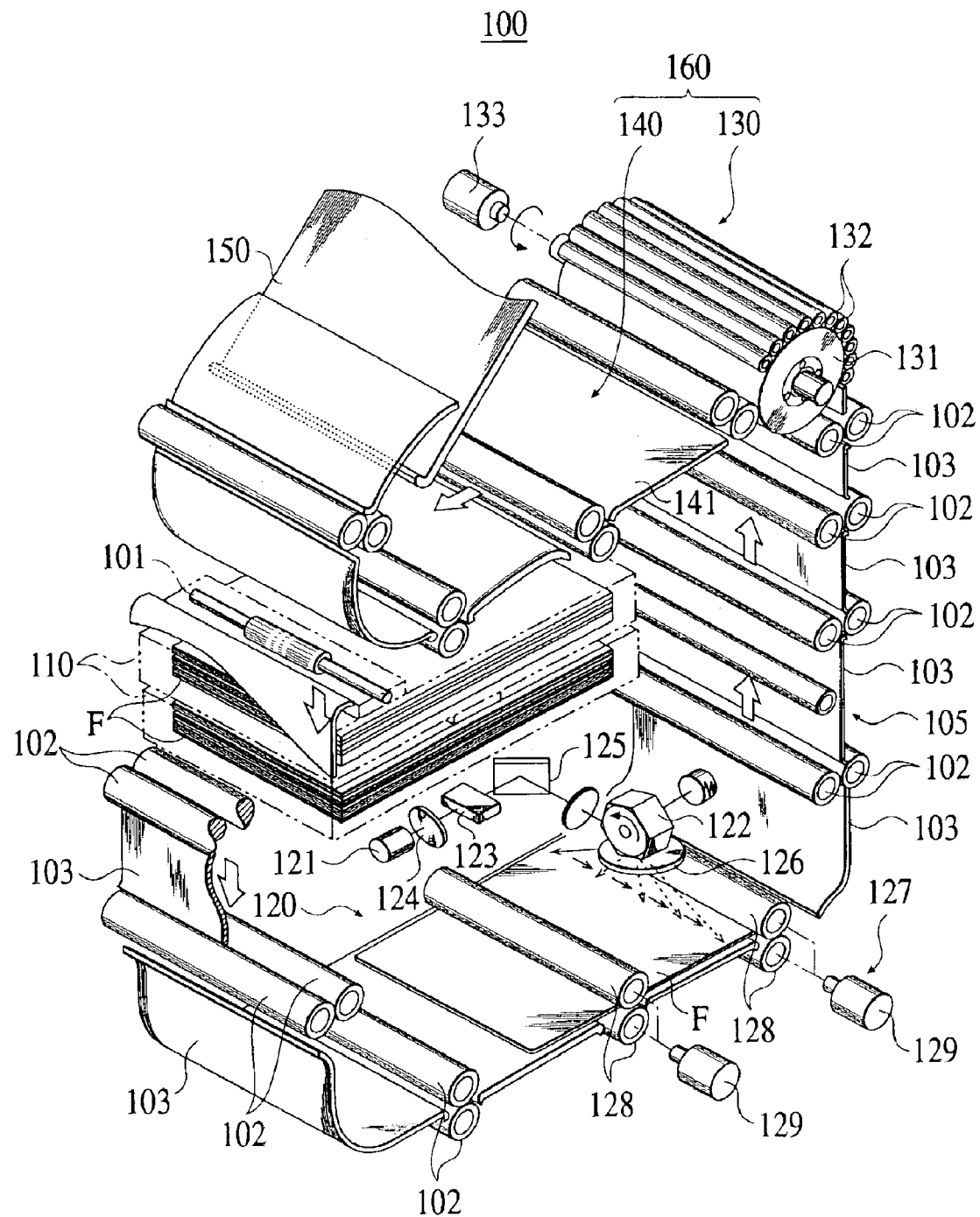
FIG. 1 is a perspective view showing a schematic construction of an image forming apparatus according to a first embodiment of the present invention.

FIG. 1 is a perspective view showing a schematic construction of an image forming apparatus 100 according to a first embodiment of the present invention. The image forming apparatus 100 shown in FIG. 1 comprises an exposure portion 120 for irradiating and exposing a laser beam (light beam) from a semiconductor laser, which is a light source, on a photothermographic imaging film F (hereinafter, it is called a "film F"), which is a photothermographic imaging material on the surface of which a photosensitive layer is formed, a thermal development portion 160 for cooling and conveying the film F after developing the exposed film F, film containing portions 110 for containing the non-exposed film F, a film outputting portion 150 for outputting the developed film F, and a convey system 105 for conveying the film F sequentially from the film containing portions 110, the exposure portion 120, the thermal development portion 160 to the film outputting portion 150.

The film containing portions 110 comprise trays containing a plurality of non-exposed piled films F. In the first embodiment, two film containing portions 110 are provided, so that it is possible to contain films F having different sizes. When the films F in the film containing portions 110 are run out, new ones will be contained by pulling out the trays.

The exposure portion 120 mainly comprises a laser oscillator 121 for oscillating a laser beam which is to be irradiated on the film F, a scanning member 122 for scanning the laser beam on the film F, and an illumination modifying member 123, such as an AOM (Acousto-Optic Modulator) or the like, for modifying the illumination of the laser beam to be scanned on the film F in accordance with the data of image which should be visualized.

The laser oscillator 121 is for oscillating a laser beam in a photosensitive wavelength region of the film F. A polygonal mirror is used as the scanning member 122 in the first embodiment. When the laser beam is irradiated while the polygonal mirror is rotated by a predetermined speed, the laser beam is scanned in the width direction of the film F by a predetermined cycle.

Further, the exposure portion 120 comprises a sub-scanning portion 127 for moving the film F with sufficient accuracy to its longitudinal direction during the exposure. Since the laser beam is scanned in the width direction by the polygonal mirror and the film F is made to move to the longitudinal direction by the sub-scanning portion 127 gradually, the laser beam becomes to be scanned in a predetermined area of the film F.

The illumination modifying member 123 comprises a light modulation element in the first embodiment. For example, an acousto-optic element can be used as the light modulation element. The acousto-optic element is for generating a diffraction ray by ultrasonic wave, and for modulating the intensity of the diffraction ray by regulating the intensity of the ultrasonic wave.

The data of the outputted image (hereinafter, image data) is inputted from the outside via a non-shown interface, and is stored in a non-shown memory. The illumination modifying member 123 modifies the irradiation of the laser beam for being scanned on the film F in accordance with the image data. As a result, the film F is exposed by the image as the image data.

In addition, the laser optical system comprises a condenser lens 124 for condensing the laser beam to the illumination modifying member 123, a collimator lens 125 for returning the laser beam irradiated from the illumination modifying member 123 to a parallel beam, an fθ lens 126 for making the laser beam reflected in the polygonal mirror condense to be a thin beam on the film F in spite of the difference in distance to the film F, and the like.

Further, the sub-scanning portion 127 comprises a pair of conveying roller pairs 128 for carrying the film F by sandwiching the film F, servomotors 129 for driving the conveying roller pairs 128, and the like. The servomotors 129 drive the conveying roller pairs 128 by synchronizing with the scanning member 122 so that the film F will move forward at a predetermined speed.

The thermal development portion 160 comprises a heating portion 130 and a cooling and conveying portion 140.

The heating portion 130 is for performing thermal development. Concretely, the heating portion 130 comprises a thermal development drum 131 and facing rollers 132 for making the film F contact with the thermal development drum 131. The thermal development drum 131 has a cylindrical shape with comparatively big diameter, and comprises a heat source in the inside, as shown in FIG. 1. The heat source is a Joule exothermic heater, lamp heater or the like. The facing rollers 132 have a long and thin shape, and are provided along the circumferential surface of the thermal development drum 131 in an equal interval.

A motor for thermal development 133 is provided in the thermal development drum 131. The exposed film F is inserted between the thermal development drum 131 and the facing rollers 132. Then, when the thermal development drum 131 is rotated by the motor for thermal development 133, the film F is carried by the thermal development drum 131 and each facing roller 132 while the film F is pressed against the circumferential surface of the thermal development drum 131. At that time, the film F is thermally developed by the heat from the thermal development drum 131.

The cooling and conveying portion 140 cools the film F thermally developed in the heating portion 130 by conveying the film F along a guide plate 141, which is a guiding member.

Further, the convey system 105 comprises a film feeding mechanism 101 for picking up and sending out the film F from the trays, a plurality pairs of conveying roller pairs 102 for carrying the film F by sandwiching it, a non-shown motor for conveying for driving the conveying roller pairs 102, guide plates 103 for guiding the film F to convey it, and the like. In addition, in the members out of the convey system 105 that come in contact with the film F, such as the conveying rolled pairs 102 and the like, special work is performed on the surface or the material is selected so that the members will not be damaged or contaminated.

The film outputting portion 150 is a tray provided on the upper surface of the image forming apparatus 100 in the first embodiment. The thermally developed film F will be outputted on the tray by being conveyed by the convey system 105.

The big feature of the image forming apparatus 100 of the first embodiment is that the apparatus comprises a temperature sensor for measuring the temperature of the place in which the film F right after being thermally developed is located, and a control unit for controlling the development time in the heating portion 130 in accordance with the signal from the temperature sensor. Hereinafter, about this feature will be explained.

Figure 2:
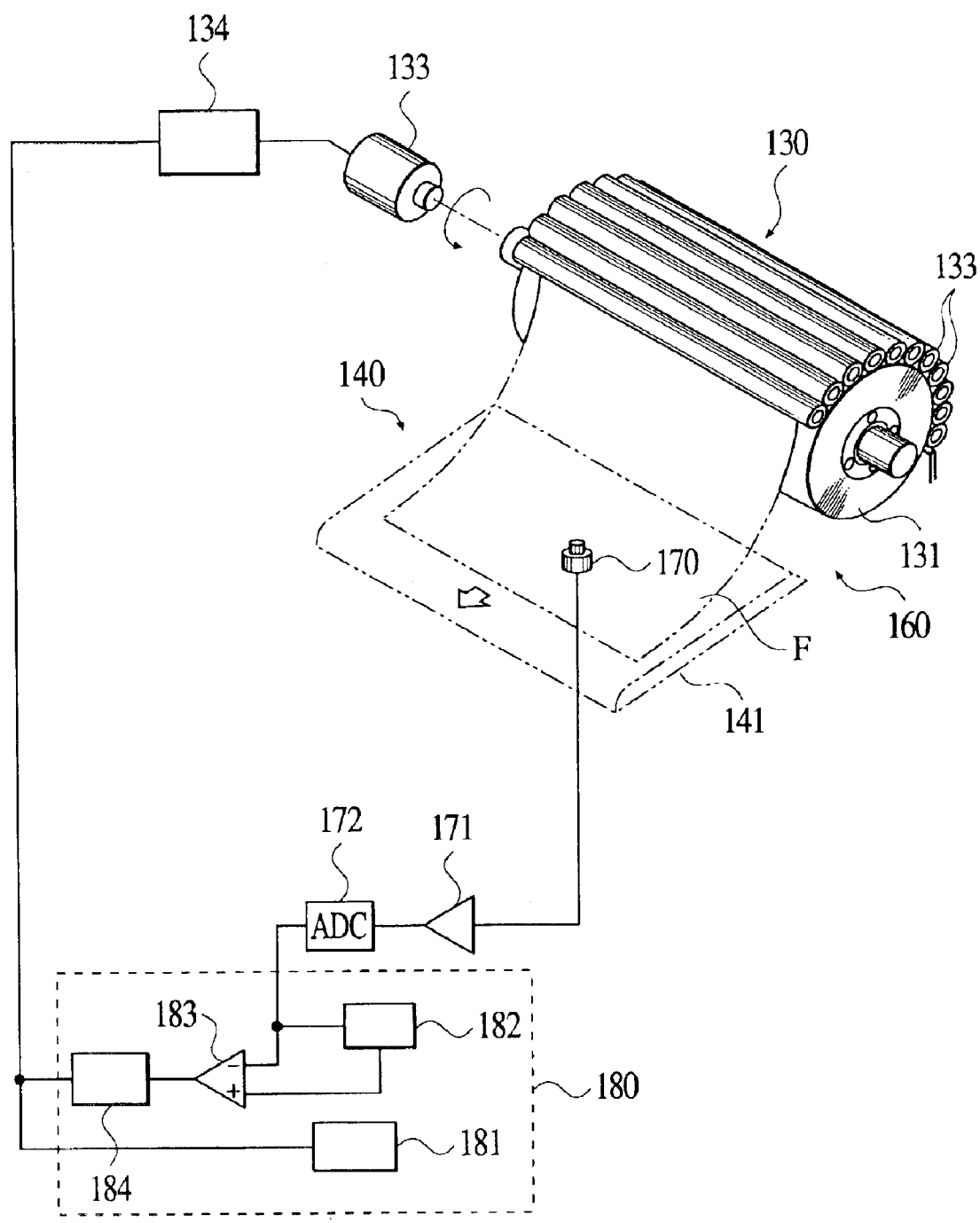
FIG. 2 is a view showing an arranged position of a temperature sensor provided in the apparatus shown in FIG. 1.

FIG. 2 is a view showing an arranged position of the temperature sensor provided in the apparatus 100 shown in FIG. 1. As shown in FIG. 2, the temperature sensor 170, which is a temperature detecting member, is provided in the lower side of the guide plate 141 provided in the cooling and conveying portion 140. In the first embodiment, the temperature sensor 170 detects the atmospheric temperature under the guide plate 141. As the temperature sensor 170, for example, the one that can convert the temperature into an electrical signal, such as a thermistor or the like, can be used.

The cooling and conveying portion 140 cools the film F right after being heated and outputted from the heating portion 130 by conveying the film F. Therefore, the cooling and conveying portion 140 is the portion which can be effected from the film F just heated by the heating portion 130 and can easily detect the atmospheric temperature effected by thermal mass of the film F. Further, detecting the heating temperature of the film F in the cooling and conveying portion 140 in the vicinity of the place that the film F is outputted from the heating portion 130 is an effective control element to control the heating temperature of the thermal development drum 131 since there is no effect of noise-like temperature variation.

In the image forming apparatus 100 of the first embodiment, each portion is controlled by the control system. That is, the control for operating each portion at a predetermined timing, such as conveying the film F by the convey system 105, exposing in the exposure portion 120, developing of the exposed film F in the heating portion 130, or the like, is performed. The control system comprises a non-shown CPU (central processing unit), a non-shown memory for storing various control programs carried out by the non-shown CPU, and the like. Further, the control system comprises a control unit 180 for controlling the development time by controlling the rotating speed of the motor for thermal development 133, which is for rotating the thermal development drum 131.

The image forming apparatus 100 of the first embodiment is for visualizing a black-and-white image. The inputted image data is visualized on the outputted film F as gradation image in black and white. In this case, if the development amount in the thermal development portion 160 is uniform, the finishing always becomes uniform. That is, if it is the same image data, the images having the same density difference can be obtained.

However, when variation in the development amount (that is, the development temperature, development time and cooling) in the thermal development portion 160 is caused, even though the image data is the same, the density of the whole image becomes high, or the density of the whole image becomes low. In case that the image forming apparatus 100 is used for outputting an image of a medical apparatus, such as an X-ray CT, NMR or the like, it may be difficult to diagnose on the basis of the image when such variation in density difference becomes conspicuous.

In the first embodiment, in order to make the finishing always uniform, a construction for performing the control of the development time is employed. That is, the uniform finishing means that the density difference of the whole image becomes uniform in case of the same image data. Otherwise, it can be described that the density of the film F is always uniform after the film F is developed when the film F is exposed at constant level corresponding to image information from diagnostic devices.

Figure 3:
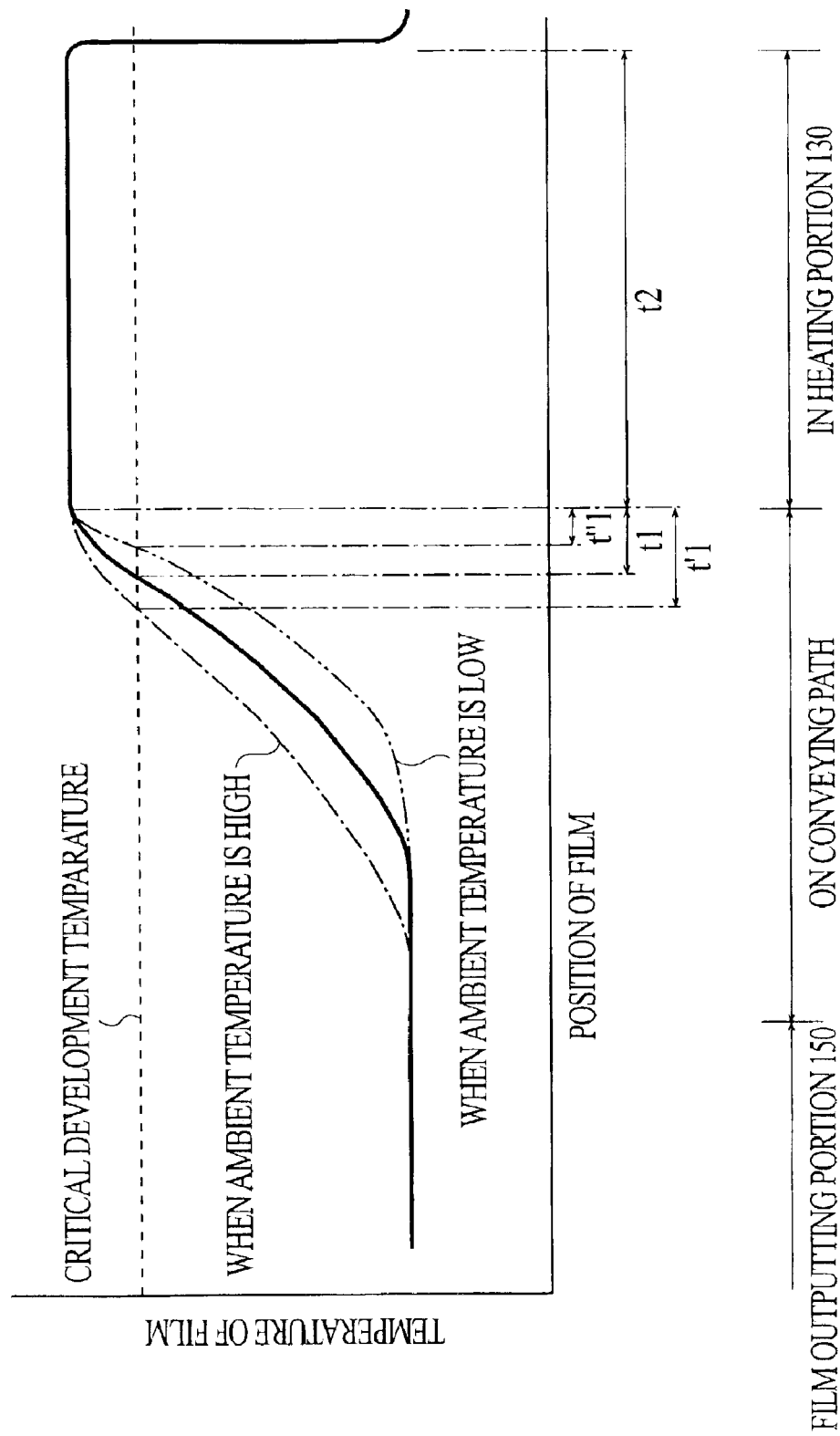
FIG. 3 is a view explaining technical significance of controlling development time by using the temperature sensor.

The technical significance of controlling the development time by using the temperature sensor 170 will be further explained by using FIG. 3. FIG. 3 is a view explaining the technical significance of controlling the development time by using the temperature sensor 170. FIG. 3 shows the condition of temperature decrease of the film F sent out from the heating portion 130. The ordinate axis is the temperature, and the abscissa axis is the position of the film F on the conveying path. In FIG. 3, the relationship between the specific portion of the film F (for example, the center) and the temperature is shown.

As it is well known, in thermal development, the development reaction causes at not less than a fixed temperature, and no development reaction causes below that temperature. Hereinafter, this temperature is called a critical development temperature. The temperature of the thermal development drum 131 is maintained at a predetermined temperature not less than the critical development temperature during the development. The film F becomes not less than the critical development temperature by the heat from the thermal development drum 131. Thereby, the development reaction proceeds.

Here, as shown in FIG. 3, the temperature of the film F decreases by heat release according to air-cooling during the step that the film F is sent out from the heating portion 130 and is conveyed by the cooling and conveying portion 140 toward the film outputting portion 150. In this case, as shown in FIG. 3, the film F after being sent out from the heating portion 130 is not less than the critical development temperature for a certain extent of time, and thereafter, it becomes below the critical development temperature. Therefore, after the film F is sent out from the heating portion 130, the development proceeds for a certain extent of time.

The temperature decrease when the film F is conveyed from the heating portion 130 to the film outputting portion 150 depends on the ambient temperature. As shown in FIG. 3, the length of time that the film F is at not less than the critical development temperature, in other words, the total thermal mass provided to the film F changes when the ambient temperature is high (one-dot chain line) compared to when the ambient temperature is low (two-dot chain line).

As shown in FIG. 3, the time that the film F is not less than the critical development temperature after it is sent out from the heating portion 130 is made to be the excess time after thermal development $t_1$, and the time that the film F is in the heating portion 130 (the time that the film F is sandwiched between the thermal development drum 131 and the facing rollers 132) is made to be the excess time in the heating portion $t_2$. Therefore, the total development time t is $t_1+t_2$. In the first embodiment, it is noted that the length of $t_1$ depends on the ambient temperature. Therefore, the change of the excess time after thermal development ($t_1'$, $t_1''$) is considered by detecting the ambient temperature, and then, the excess time in the heating portion $t_2$ is adjusted in accordance with the change. Thereby, the total development time t becomes constant in spite of the change of the ambient temperature.

As shown in FIG. 2, the control unit 180 comprises an initial setting circuit 181 for setting the initial rotating speed of the motor for thermal development 133 in accordance with the temperature detected by the temperature sensor 170 (hereinafter, detected temperature), a hold circuit 182 for updating and holding the detected temperature of the temperature sensor 170 at each time of the thermal development, a comparator 183 for comparing the detected temperature sent from the temperature sensor 170 and the previous detected temperature held in the hold circuit 182, a signal outputting circuit 184 for outputting a correcting signal in accordance with the output from the comparator 183, and the like. In addition, the signal of the temperature sensor 170 is sent to the control unit 180 through an amplifier 171 and an analog-digital converter 172.

Figure 4:
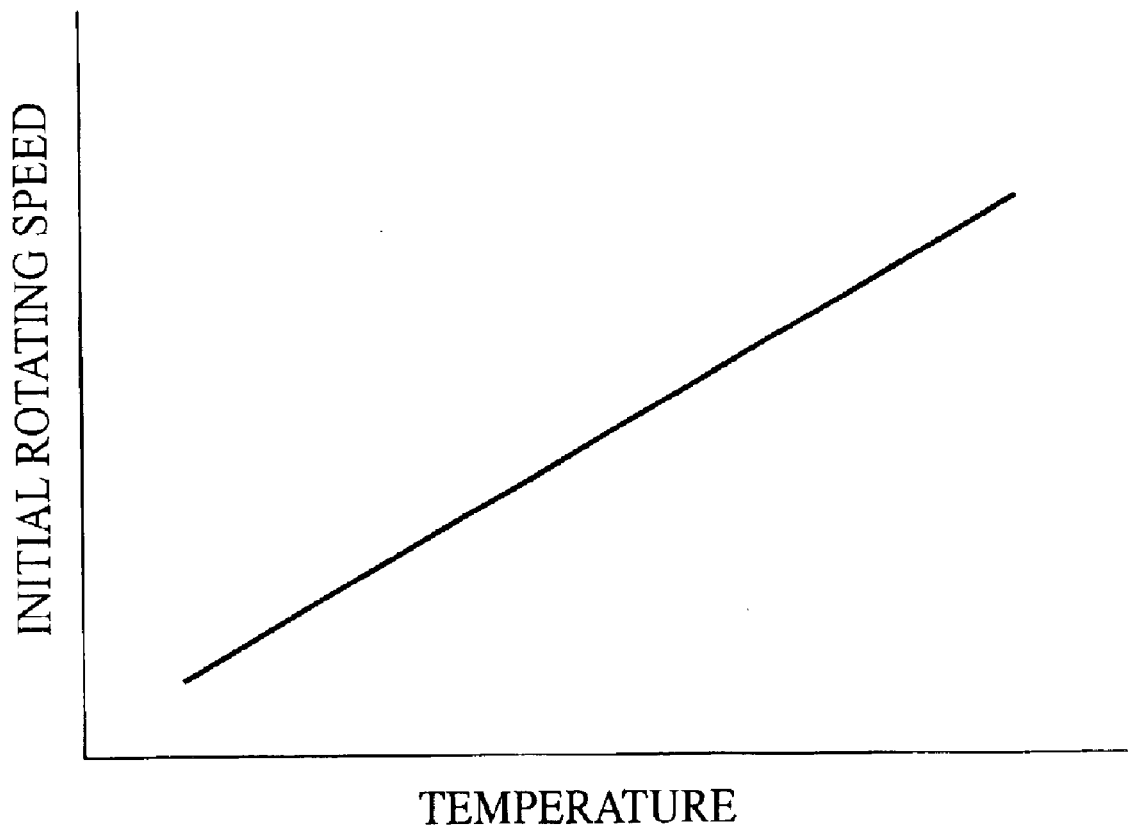
FIG. 4 is a view explaining about initial setting of rotating speed of a motor for thermal development.

FIG. 4 is a view explaining about the initial setting of rotating speed of the motor for thermal development 133. The initial rotating speed of the motor for thermal development 133 is set in accordance with the initial detected temperature of the temperature sensor 170. As mentioned above, the length of the excess time after thermal development $t_1$ depends on the temperature of the place right after the heating portion 130 in which the film F is located. Therefore, in case that the total development time t is made to be constant, into what length the excess time in the heating portion $t_2$ should be made corresponds by one-on-one in each temperature. Therefore, the rotating speed of the motor for thermal development 133 for making the total development time t constant corresponds by one-on-one to the temperature, and it can be schematically shown as a graph shown in FIG. 4. The initial setting circuit 181 selects the rotating speed of the motor for thermal development 133 that satisfies the constant total development time t in accordance with the initial detected temperature of start-up of the image forming apparatus 100. Then, the rotating speed is sent to a motor controller 134. Thus, the circuit is realized.

Hereinafter, the operation of the control unit 180 will be explained.

At first, when the power supply of the image forming apparatus 100 is turned on, the temperature sensor 170 detects the temperature in accordance with the control sequence, and inputs the signal of the detected temperature to the initial setting circuit 181. The initial setting circuit 181 sends the signal of the initial rotating speed to the motor controller 134 as mentioned above. Further, the signal of the detected temperature is sent to and held in the hold circuit 182.

When the first image data is sent, exposure and thermal development are performed. At that time, the motor controller 134 makes the motor for thermal development 133 rotate at the initial rotating speed. Then, image data are sent in sequence, and the exposure and thermal development of the films F are repeated. At that time, the signal of the detected temperature is sent to the comparator 183 in advance of the development in the heating portion 130. In the comparator 183, the signal of the detected temperature detected in advance of the previous development is already inputted, and both are compared by the comparator 183. The output of the comparator 183 is inputted in the signal inputting circuit 183, and a correcting signal is outputted in accordance with the output of the comparator 183.

When the sending of the films F from the thermal development drum 131 is repeated, the temperature in the vicinity of the guide plate 141 in the cooling and conveying portion 140 increases. Therefore, the signal of the detected temperature sent from the temperature sensor 170 becomes large compared to the previously detected temperature inputted from the hold circuit 182, so that an output is generated from the comparator 183. The signal inputting circuit 184 outputs a correcting signal for making the difference small. For example, when the detected temperature of the present time increases for 3% compared to the detected temperature of the previous time, the signal inputting circuit 184 outputs a correcting signal for increasing the rotating speed of the motor for thermal development 133 for 3% to the motor controller 134. As a result, the rotating speed increases for 3%, and the excess time in the heating portion $t_2$ becomes short for 3%. Thereby, even though the temperature increases, the total development time t is kept constant. Further, when the temperature of the atmosphere or the members in the cooling and conveying portion 140 decreases by heat release according to air-cooling since there is free time from the previous exposure and thermal development, the comparator 183 also generates an output. Then, the signal inputting circuit 184 outputs a correcting signal for compensating the temperature decrease. For example, when the detected temperature decreases for 2%, the signal inputting circuit 184 outputs a correcting signal for decreasing the rotating speed of the motor for thermal development 133 for 2% to the motor controller 134. As a result, the rotation speed decreases for 2%, and the excess time in the heating portion $t_2$ becomes long for 2%. Thereby, even though the temperature decreases, the total development time t is kept constant.

According to the image forming apparatus of the first embodiment, the temperature in the cooling and conveying portion 140 is detected by the temperature sensor 170, and the development time is feedback controlled in accordance with the detected temperature, as mentioned above. Therefore, even though the temperature varies, the finishing of the film F is maintained uniform.

[Second Embodiment]

Figure 5:
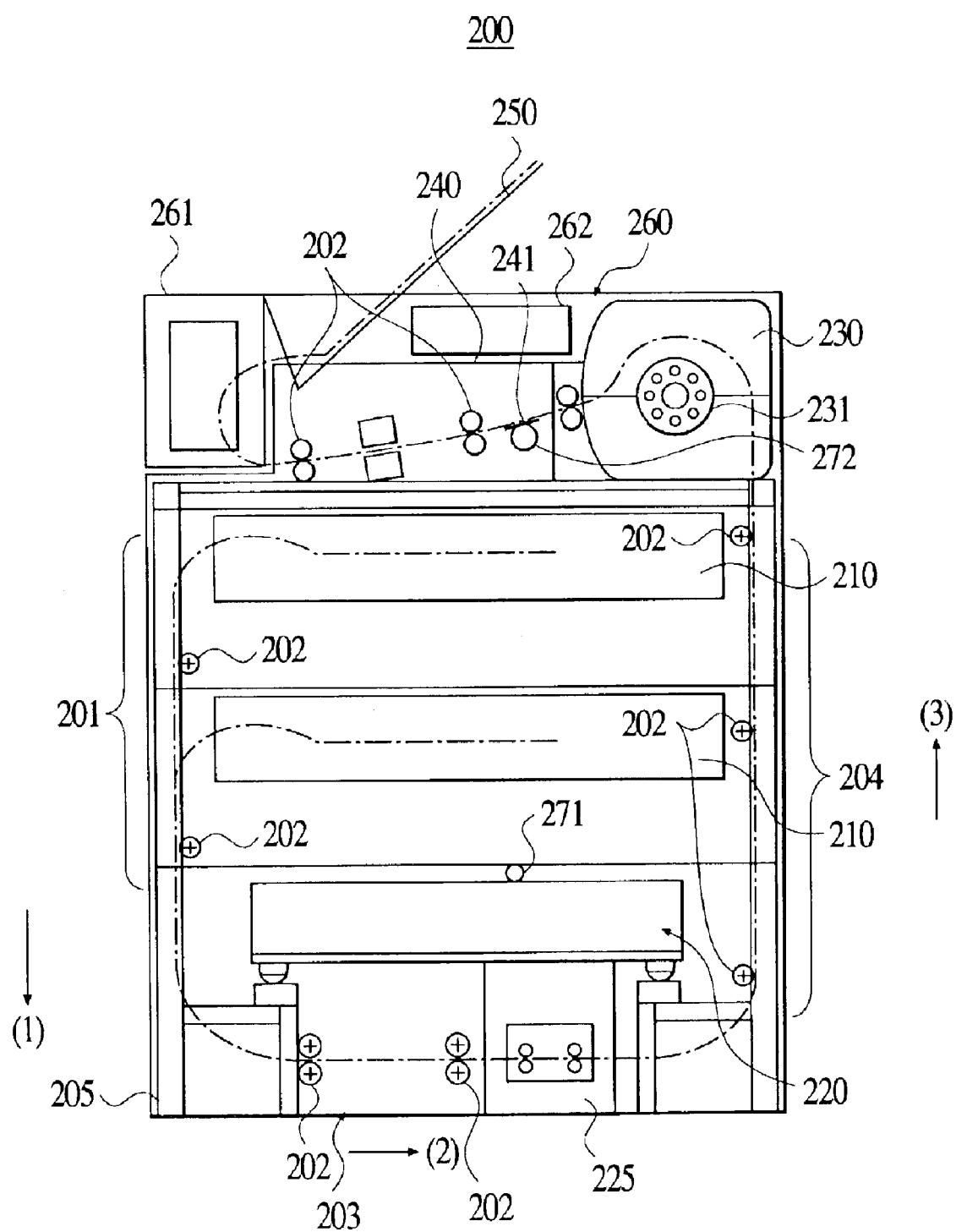
FIG. 5 is a front view showing an image forming apparatus according to a second embodiment of the present invention.
Figure 6:
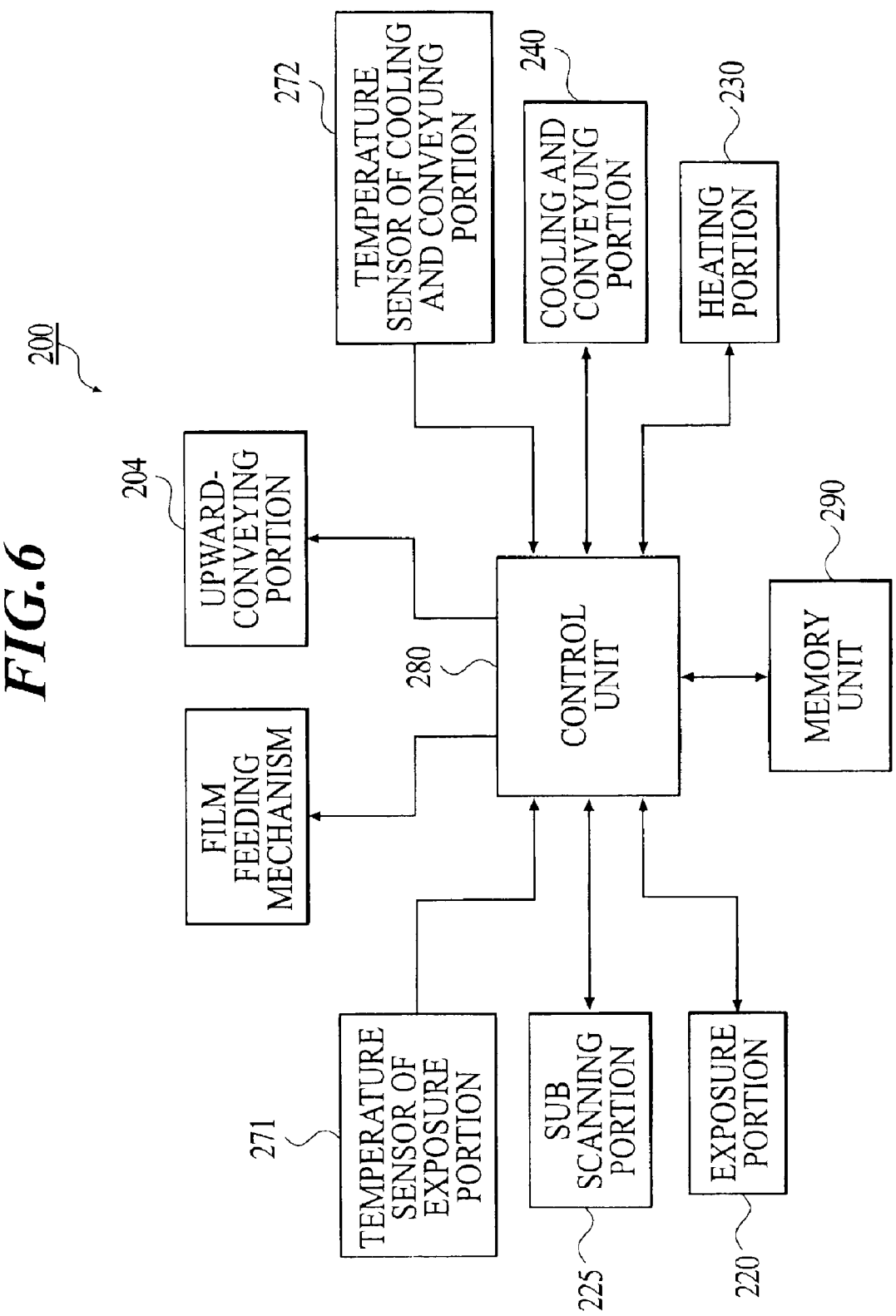
FIG. 6 is a block diagram showing a construction of principal function of control system of the image forming apparatus in FIG. 5.

FIGS. 5 and 6 are views showing a second embodiment of the image forming apparatus to which the present invention is applied.

At first, the construction will be explained.

FIG. 5 is a front view showing the image forming apparatus 200 according to the second embodiment of the present invention. In FIG. 5, the image forming apparatus 200 comprises a plurality of film containing portions 210 for containing films F before an image according to a latent image is formed by a laser beam from a semiconductor laser, which is a light source, is performed. Moreover, the apparatus 200 comprises a well-known film feeding mechanism for taking out a plurality of films F contained in the film containing portions 210 by absorbing the films F by negative pressure of suckers and moving them one by one, in the inside thereof.

The image forming apparatus 200 comprises a downward conveying portion 201 for conveying the outputted film F by a plurality of conveying roller pairs 202 to the lower direction (1) in FIG. 5, a position regulating portion 203 for regulating the position of the film F conveyed from the downward conveying portion 201, correcting the curve of the film F and conveying the film F to the horizontal direction (2) by a plurality of conveying roller pairs 202, and a sub-scanning portion 225 for moving the film F sent from the position regulating portion 203, the curve of the film F being corrected, to the sub-scanning direction (horizontal direction (2)) at a constant speed. The sub-scanning portion 225 comprises two conveying roller pairs and the like, as shown in FIG. 5.

Further, the image forming apparatus 200 comprises an exposure portion 220 for scanning the film F at the sub-scanning portion 225 by exposing a laser beam modulated on the basis of image information to the film F so as to form a latent image in accordance with the image information, and an upward conveying portion 204 for conveying the film F, in which the latent image is formed by the exposure portion 220 at the sub-scanning portion 225, to the upper direction (3) in FIG. 5 by a plurality of conveying roller pairs 202.

The laser beam will be irradiated to the sub-scanning portion 225 in the downward direction from the exposure portion 220, as shown in FIG. 5. Further, the upward conveying portion 204 comprises a shunting function of the conveying roller for not giving a shock to the long conveying path, which is for conveying the film F from the sub-scanning portion 225 to the upper portion of the body of the apparatus 200, and to the film F, and the like.

The image forming apparatus 200 comprises a thermal development portion 260 for thermally developing the film F by heating the film F in which the latent image is formed as mentioned above and for cooling and conveying the film F, on the upper portion thereof. The film F in which the image information is visualized by being thermally developed in the thermal development portion 260 is cooled. Then, the film F is conveyed to a film outputting portion 250 and outputted to the outside of the apparatus 200.

The thermal development portion 260 comprises a heating portion 230 having a thermal development drum 231, a cooling and conveying portion 240 for cooling the thermally developed film F by conveying the film F along a guiding surface (conveying surface) of a guide plate 141, which is a conveying member, a conveying portion 261 for further conveying the film F to the film outputting portion 250, and a deodorizing member 262 for removing organic gas generated at the time of thermal development of the film F. In addition, the guide plate 141 is formed by a metal plate, and a heat insulation member (nonwoven fabric, resin, rubber or the like) is stuck onto the guide surface so that the thermally developed film F cannot be in contact with the surface of the metal plate directly.

As shown in FIG. 5, the image forming apparatus 200 contains the above-mentioned sub-scanning portion 225, exposure portion 220, thermal development portion 260 and the like in a light-shielding frame member 205 by covering them in an almost light-shielded state. Since the sub-scanning portion 225 and the exposure portion 220 are disposed under the thermal development portion 260 via the film containing portions 210, the heated air from the thermal development portion 260 can hardly reach the sub-scanning portion 225 and the exposure portion 220. The film F is conveyed from the film containing portion 210 to the film outputting portion 250 as mentioned above by passing the conveying path shown by one-dot chain line in FIG. 5.

Further, in FIG. 5, a temperature sensor of exposure portion 271, which is a temperature detecting member, is provided on the upper portion of the exposure portion 220. The temperature sensor of the exposure portion 271 detects the temperature in the vicinity of the exposure portion 220, and outputs a signal of the detected temperature to a later-described control unit 280 (c.f. FIG. 6). Further, a temperature sensor of the cooling and conveying portion 272, which is a temperature detecting member, is provided on the surface of the metal plate in the opposite side of the guiding surface of the guide plate 241 in the cooling and conveying portion 240. The temperature sensor of the cooling and conveying portion 272 detects the temperature transmitted from the film F conveyed along the guiding surface of the guide plate 241 to the rear surface of the guide plate 241, and outputs a signal of the detected temperature to the later-described control unit 280 (c.f. FIG. 6).

FIG. 6 is a block diagram showing a construction of principal function of control system of the image forming apparatus 200 in FIG. 5. The same reference numerals are given to the same configuration blocks as the construction portions shown in FIG. 5, and the explanation of the constructions is omitted. In FIG. 6, the control system of the image forming apparatus 200 comprises the film feeding mechanism, the sub-scanning portion 225, the exposure portion 220, the upward conveying portion 204, the heating portion 230, the cooling and conveying portion 240, the temperature sensor of the exposure portion 271, the temperature sensor of the cooling and conveying portion 272, the control unit 280, a memory unit 290 and the like.

The control unit 280 controls each portion on the basis of various control programs stored in the memory unit 290. The control unit 280 controls the film feeding operation of the film feeding mechanism, the sub-scanning operation of the sub-scanning portion 225, the main-scanning operation of the exposure portion 220, the upward conveying operation of the upward conveying portion 204, the temperature control of the heat source and the speed control of the conveying in the heating portion 230, the speed control of the conveying in the cooling and conveying portion 240, and the like.

Further, the control unit 280 controls the conveying speed of the thermal development drum 231 for thermally developing and conveying the film F in the heating portion 230 on the basis of the signal of the detected temperature inputted from the temperature sensor of the exposure portion 271 and the signal of the detected temperature inputted from the temperature sensor of the cooling and conveying portion 272. In this case, the control unit 280 observes the variation of the temperature in the vicinity of the exposure portion 220 and the variation of the heating temperature of the film F at the guide plate 241 in the cooling and conveying portion 240 on the basis of the signal of each detected temperature detected by the temperature sensor of the exposure portion 271 and the temperature sensor of the cooling and conveying portion 272, respectively. Then, the control unit 280 controls the conveying speed of the film F conveyed on the thermal development drum 231 (the rotating speed of the thermal development drum 231) in the heating portion 230 on the basis of each temperature value.

For example, as the control procedure in the control unit 280 when controlling the conveying speed of the film F, the conveying speed of the film F which determines the thermal development condition in the thermal development drum 231 in the heating portion 230 may be calculated on the basis of the arithmetic expressions including "correlation between the detected temperature in the exposure portion and the density value of the thermally developed film", "correlation between the detected temperature in the cooling and conveying portion and the density of the thermally developed film", "film conveying speed" and the like that affect the thermal development condition of the film F. Further, a look-up table in which the relationship among the detected temperature in the exposure portion, the detected temperature in the cooling and conveying portion, and the film conveying speed is set beforehand may be stored in the memory unit 290, and the conveying speed of the film F may be determined with reference to the look-up table.

The grounds of such control procedure will be explained simply.

In the inside of the image forming apparatus 200, when a plurality of films F are thermally developed continuously, both of the temperature in the vicinity of the exposure portion 220 and the temperature of the surface of the guide plate 241 in the cooling and conveying portion 240 vary in accordance with the elapsed time. It is possible to find the effect of the total variation including the variation of environmental temperature of the room in which the apparatus is installed together with the above-mentioned variation of each portion to the oscillation wavelength of the semiconductor laser, which is a light source, and to the density value of the film F after being developed as heat correlation. Further, it is possible to find the effect of this heat correlation to the development condition (density value) of the film F conveyed being in close contact with the thermal development drum 231 in the heating portion 230 by the correlation with the conveying speed.

Therefore, in the second embodiment, the control unit 280 observes the variation of the temperature in the vicinity of the exposure portion 220 and the variation of the heating temperature of the film F at the guide plate 241 in the cooling and conveying portion 240 on the basis of the signal of each detected temperature detected by the temperature sensor of the exposure portion 271 and the temperature sensor of the cooling and conveying portion 272, respectively. Thereby, the control unit 280 can control the conveying speed of the film F in the heating portion 230 on the basis of each detected temperature value.

The memory unit 290 stores various control programs carried out by the control unit 280, and also stores the arithmetic expressions for calculating the above-described conveying speed or stores the above-described look-up table or the like.

Next, the operation of the second embodiment will be explained.

The control processing of the conveying speed in the heating portion 230 carried out by the control unit 280 in FIG. 6 will be explained. The control unit 280 observes the variation of the temperature in the vicinity of the exposure portion 220 and the variation of the heating temperature of the film F at the guide plate 241 in the cooling and conveying portion 240 on the basis of the signal of each detected temperature detected by the temperature sensor of the exposure portion 271 and the temperature sensor of the cooling and conveying portion 272, respectively. Then, the control unit 280 reads out the conveying speed according to calculation on the basis of each temperature value and the above-described arithmetic expressions stored in the memory unit 290 beforehand, or the conveying speed corresponding to the temperature value stored in the above-described look-up table. Thereafter, the control unit 280 controls the conveying speed of the film F conveyed on the thermal development drum 231 (the rotating speed of the thermal development drum 231) in the heating portion 230.

Thus, the control unit 280 controls the conveying speed of the film F on the thermal development drum 231 in the heating portion 230. Thereby, the effect of the temperature in the vicinity of the exposure portion 220 to the thermal development condition is considered, and also the heating temperature of the film F outputted to the guide plate 241 in the cooling and conveying portion 240 is detected sufficiently. Therefore, the conveying speed of the film F, which determines the thermal development condition in the thermal development drum 231 in the heating portion 230, can be controlled with sufficient accuracy, and the image density of the thermally developed film F can be controlled sufficiently.

[Third Embodiment]

Figure 7:
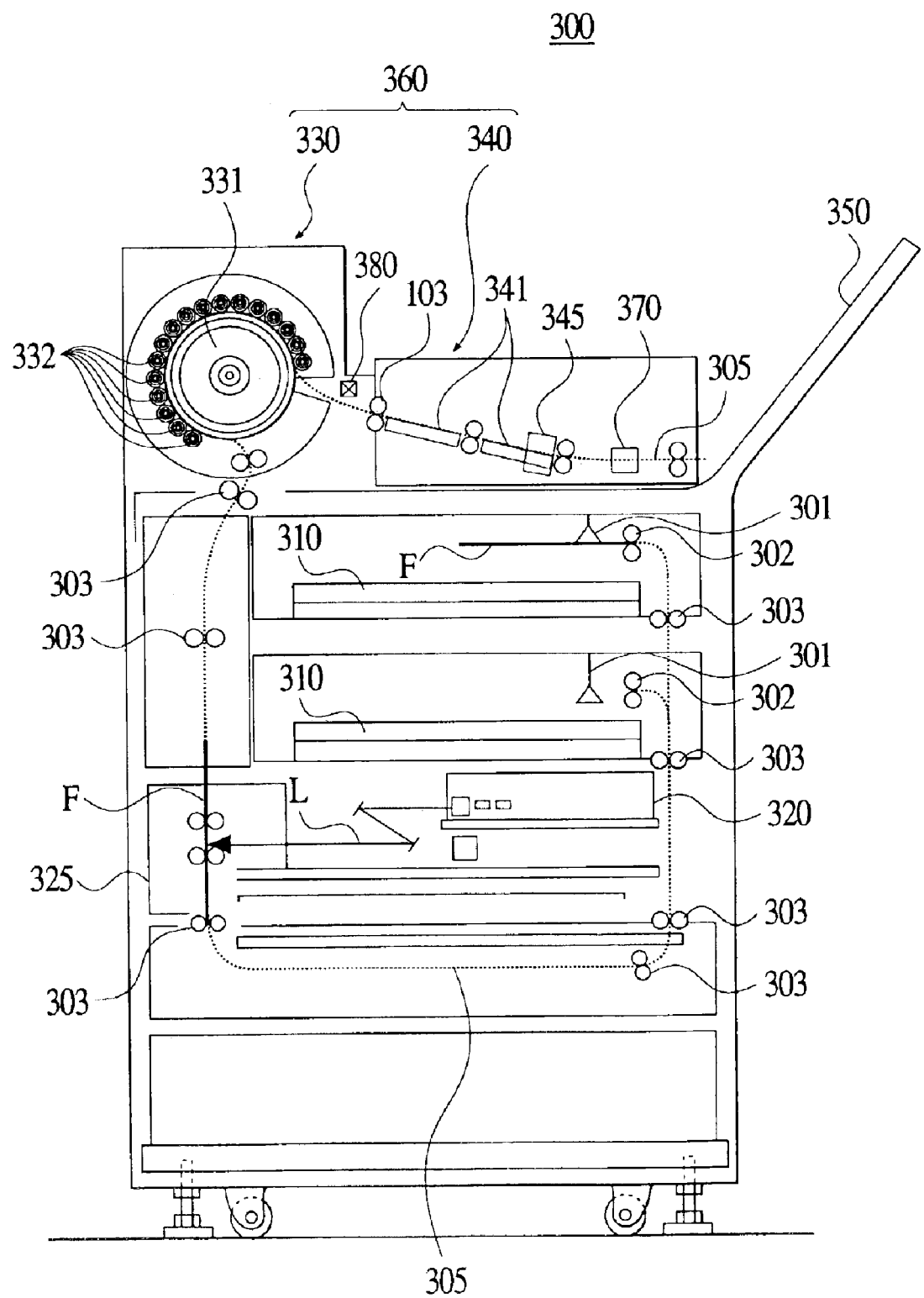
FIG. 7 is a cross sectional front view schematically showing an image forming apparatus according to a third to fifth embodiments of the present invention.
Figure 8:
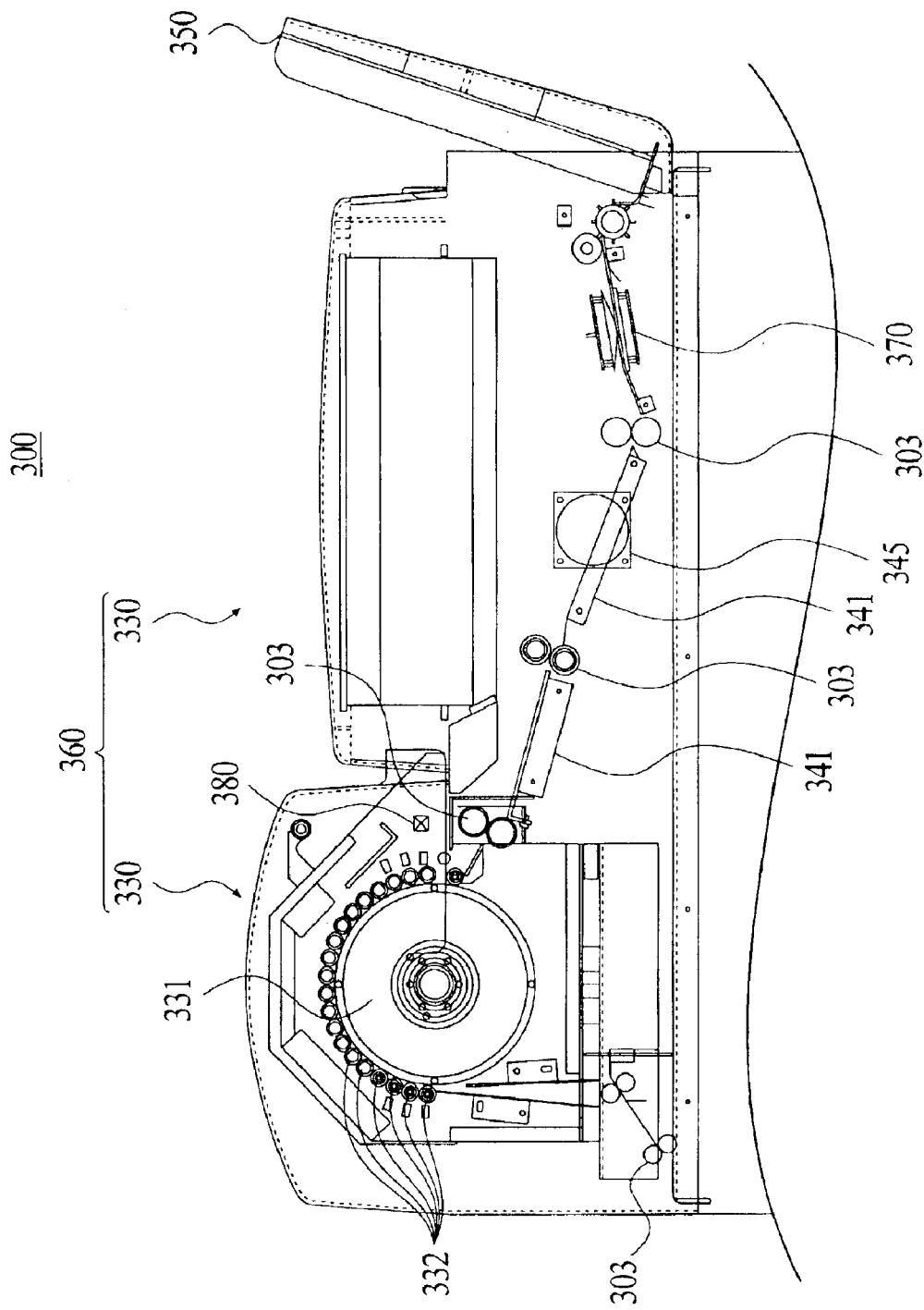
FIG. 8 is a cross sectional front view schematically showing a thermal development portion of the image forming apparatus according to the third to fifth embodiments of the present invention.
Figure 9:
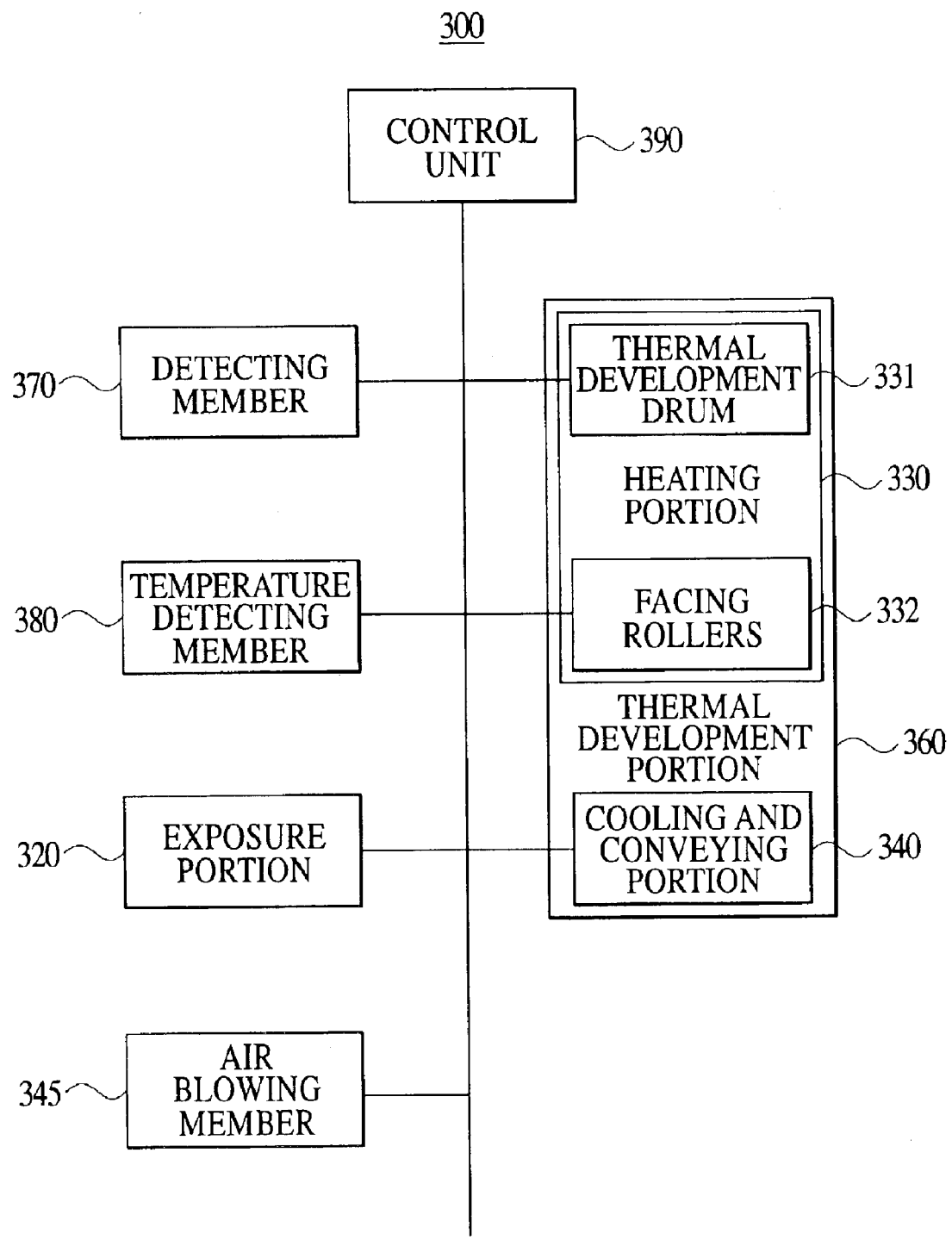
FIG. 9 is a block diagram showing a principal construction of the image forming apparatus according to the third to fifth embodiments of the present invention.

FIG. 7 is a cross sectional front view schematically showing an image forming apparatus 300 according to a third embodiment of the present invention. FIG. 8 is a cross sectional front view schematically showing a thermal development portion 360 of the image forming apparatus 300. FIG. 9 is a block diagram showing a principal construction of the image forming apparatus 300.

As shown in FIG. 7, the thermal development portion 360 is provided on the upper portion of the image forming apparatus 300. The thermal development portion 360 comprises a heating portion 330, a cooling and conveying portion 340 and the like.

The heating portion 330 shown in FIGS. 7 and 8, is for thermally developing a sheet-like film F by heating it, and for example, comprises a thermal development drum 331, facing rollers 332 and the like. The facing rollers 332 press the film F against the surface of the thermal development drum 331. Thereby, the thermal development processing is performed by heating the film F.

The cooling and conveying portion 340 cools and conveys the film F thermally developed in the heating portion 330, and outputs the film F to the film outputting portion 350.

A detecting member 370 is, for example, a sensor such as a photo sensor or the like, for detecting the number of the thermally developed films F, which is a quantitative processing history. The detecting member 370 is provided, for example, on the conveying path of the film F in the cooling and conveying portion 340. Then, when the detecting member 370 detects the film F, it outputs a sensing signal to a later-described control unit 390.

A temperature detecting member 380 is, for example, a sensor such as a temperature sensor, for detecting the temperature in a predetermined portion of the image forming apparatus 300. The temperature detecting member 380 is provided, for example, to detect the atmospheric temperature between the heating portion 330 and the cooling and conveying portion 340. Then, the temperature detecting member 380 outputs a detected detecting signal to the later-described control unit 390.

An air-blowing member 345 performs cooling operation as a cooling member which decreases the temperature in the heating portion 330 or the cooling and conveying portion 340 or the atmospheric temperature around them by cooling air in order to decrease the too-much increased temperature in the inside of the thermal development portion 360.

Further, as shown in FIG. 9, the image forming apparatus 300 comprises a control unit 390 for generally controlling the image forming apparatus 300 and performing various processing, judgments and the like. The detecting member 370, the temperature detecting member 380, the exposure portion 320, the thermal development portion 360, the air blowing member and the like are connected to the control unit 390 through a bus or the like.

However it is not shown, the control unit 390 comprises a CPU for performing various arithmetic processing, a ROM for recording and storing various programs for various processing, such as control, judgment and the like, data of various thermal development processing condition, and the like, and a RAM used as a work memory in various processing.

The control unit 390 performs various processing, such as control, judgment and the like, on the basis of the sensing signal, the detecting signal and the like from the detecting member 370, temperature detecting member 380 and the like. Further, the control unit 390 controls various driving units, and performs control or the like of the conveying operation of the film F, the exposure processing operation of the exposure portion 320, the thermal development processing operation of the thermal development portion 360, the cooling operation of the air blowing member 345, and the like.

For example, the control unit 390 performs the control of stopping the thermal development processing operation of the thermal development portion 360 for a predetermined time on the basis of the judgment that the number of the thermal developed films F detected by the detecting member 370 has reached a predetermined number of films F (quantitative processing history).

Further, the control unit 390 performs the control of setting the stop time for stopping the processing operation on the basis of the temperature of a predetermined portion in the heating portion 330 and the cooling and conveying portion 340 that is detected by the temperature detecting member 380.

Further, the control unit 390 performs the control of canceling the stop of the thermal development processing operation (restart the operation) when the temperature in the predetermined portion in the heating portion 330 and the cooling and conveying portion 340 that is detected by the temperature detecting member 380 is within a predetermined temperature range.

Further, on the basis of the temperature of the predetermined portion in the heating portion 330 and the cooling and conveying portion 340 that is detected by the temperature detecting member 380, the control unit 390 performs the control of stopping the thermal development processing operation of the heating portion 330 and the cooling and conveying portion 340 when the temperature is in outside of a predetermined temperature range. Then, the control unit 390 performs the control of canceling the stop of the thermal development processing operation of the heating portion 330 and the cooling and conveying portion 340 when the temperature is within the predetermine temperature range.

Further, on the basis of the temperature of the predetermined portion in the heating portion 330 and the cooling and conveying portion 340 that is detected by the temperature detecting member 380, the control unit 390 performs the control of stopping the thermal development processing operation of the heating portion 330 and the cooling and conveying portion 340 and of operating the air blowing member 345 when the temperature is not less than a predetermined temperature. Then, the control unit 390 performs the control of canceling the stop of the thermal development processing operation of the heating portion 330 and the cooling and conveying portion 340 and of stopping the operation of the air blowing member 345 when the temperature is within the predetermined temperature range.

The exposure portion 320 exposes a laser beam L whose intensity is modulated on the basis of a digital image signal by irradiating the laser beam L on the film F, so that a latent image is formed on the film F.

Next, according to the image forming apparatus 300 schematically shown in FIGS. 7 and 8, the processing operation of the image forming apparatus 300 and the processing steps of the film F will be explained.

At first, the film F contained in the film containing portions 310 is taken out by a film feeding mechanism 301, and is fed to a feed roller pair 302. The film F conveyed by the feed roller pair 302 is sent by conveying roller pairs 303. The conveying roller pairs 303 convey the film F along the conveying path 305. Then, the exposure portion 320 irradiates and exposes the laser beam L on the film F at the sub-scanning portion 325 provided on the conveying path 305, so that the latent image is formed on the film F.

Next, the film F is conveyed to the heating portion 330 by the conveying roller pairs 303. The film F is heated by being pressed against the thermal development drum 331 heated in a predetermined temperature, for example, between 120° C. and 130° C., by the facing rollers 332, and is conveyed according to the rotating operation of the thermal development drum 331 and the facing rollers 332.

Then, the film F is conveyed to the cooling and conveying portion 340 by the conveying roller pairs 303. The cooling and conveying portion 340 comprises a guide plate 341 on the conveying path 305. The film F is conveyed along the guide plate 341, and cooled by heat release according to air-cooling. The cooled film F is outputted from the film outputting portion 350 by the conveying roller pairs 303.

In addition, an air-blowing member 345 for decreasing the temperature in the heating portion 330 or the cooling and conveying portion 340 or the atmospheric temperature around them by cooling air in order to decrease the too-much increased temperature is provided in the heating portion 330 or the cooling and conveying portion 340. The air blowing member 345 is not operated during the thermal development processing operation, and is operated only during the stop of the thermal development processing operation.

Next, the operation of the above-described image forming apparatus 300 in the third embodiment will be explained with reference to the flowchart shown in FIG. 10.

Figure 10:
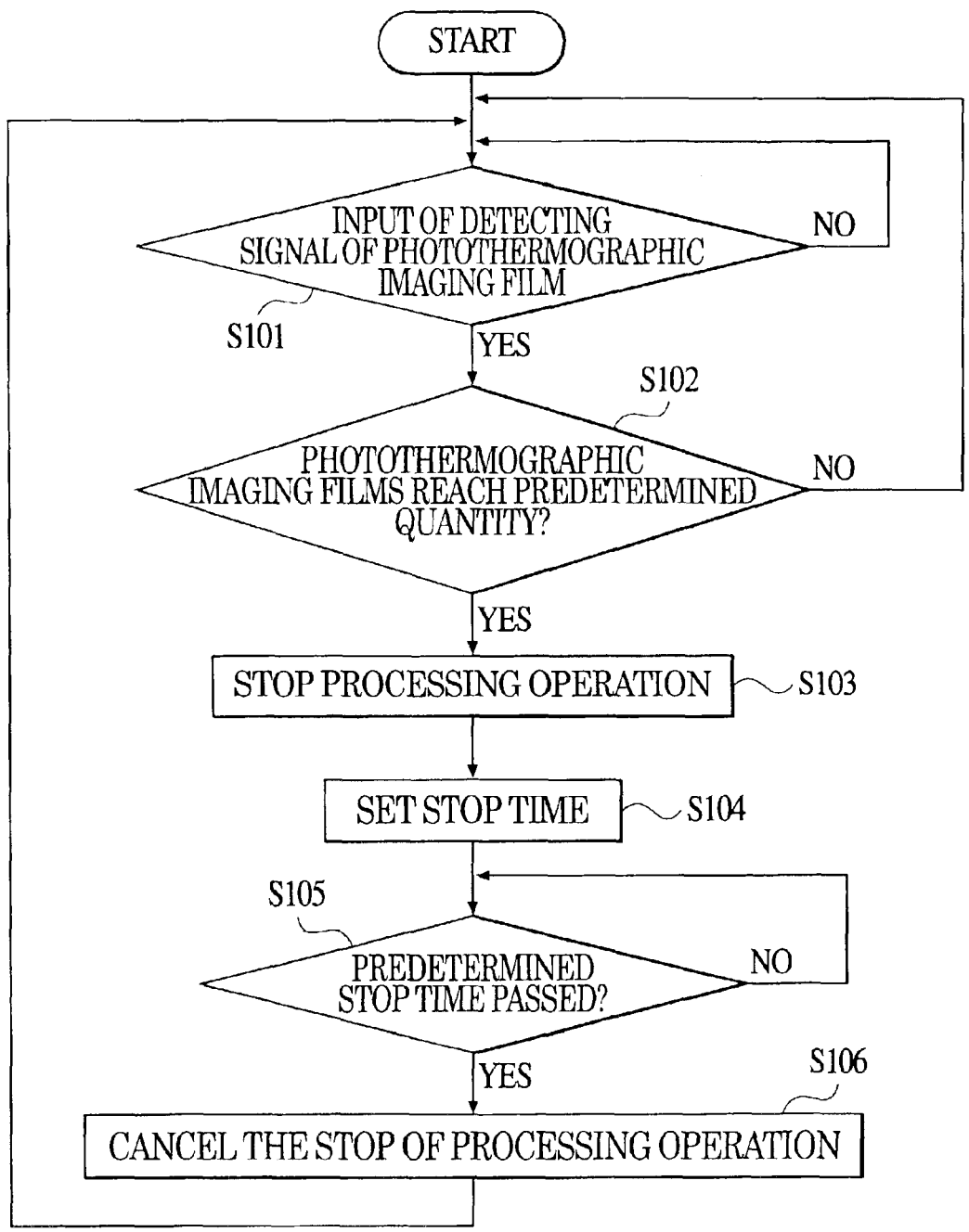
FIG. 10 is a flow chart showing an operation of the third embodiment of the present invention.

In FIG. 10, during the use of the image forming apparatus 300, the detecting member 370 detects the thermally developed films F. When a signal showing the detection of the films F is inputted from the detecting member 370 to the control unit 390 (Step S101; Yes), it proceeds to Step S102. Next, the control unit 390 judges whether the detected films F have reached a predetermined number or not (Step S102). Then, when the control unit 390 judges that the detected films F have not reached a predetermined number (Step S102; No), it returns to Step S101. On the other hand, when the control unit 390 judges that the detected films F have reached a predetermined number (Step S102; Yes), it stops the processing operation of the thermal development portion 360 (Step S103).

Next, the control unit 390 sets the stop time for stopping the processing operation of the thermal development portion 360 on the basis of the temperature detected by the temperature detecting member 380 (Step S104).

Then, the control unit 390 judges whether a predetermined stop time has passed or not (Step S105). When the control unit 390 judges that a predetermined stop time has not passed (Step S105; No), it is repeated until the predetermined stop time passes. On the other hand, when the control unit 390 judges that a predetermined stop time has passed (Step S105; Yes), it cancels the stop of processing operation of the thermal development portion 360 (Step S106), and restarts the processing operation of the image forming apparatus 300. Then, it returns to Step S101.

Thus, in the image forming apparatus 300, when a predetermined number of the thermally developed films F are detected by the detecting member 370, the processing operation of the thermal development portion 360 is stopped for a predetermined time. Therefore, the films F not less than a predetermined number cannot be processed continuously. Accordingly, an extreme temperature variation in the image forming apparatus 300 according to continuous processing can be prevented. Therefore, the temperature difference in thermal development processing, the difference in processing condition can be eliminated, so that the density difference of the thermally developed films F can be prevented from being caused. Thereby, stable thermal development processing can be performed.

Further, since the setting of a predetermined time for stopping the processing operation of the thermal development portion 360 can be set on the basis of the temperature of the predetermine portion of the image forming apparatus 300 that is detected by the temperature detecting member 380, the stop of the processing operation corresponding to the temperature condition which changes according to the processing situation of the image forming apparatus 300 can be performed.

In addition, the stop time set in Step S104 may be the stop time set beforehand.

[Fourth Embodiment]

Next, the operation in a fourth embodiment of the present invention will be explained along a flowchart shown in FIG. 11. In addition, since the construction of the image forming apparatus 300 is the same as in the third embodiment, the explanation is omitted.

Figure 11:
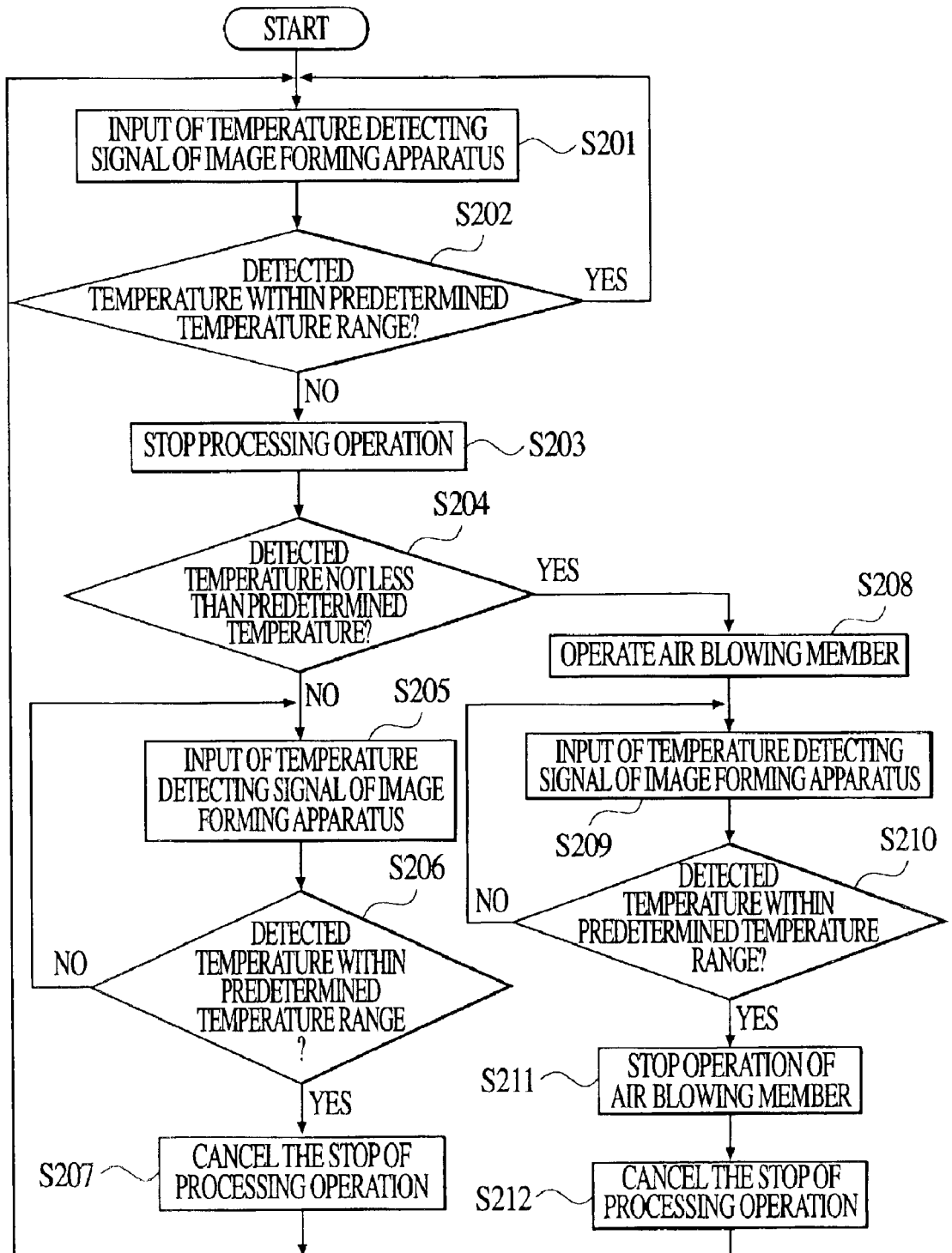
FIG. 11 is a flow chart showing an operation of the fourth embodiment of the present invention.

In FIG. 11, during the use of the image forming apparatus 300, when the temperature detecting member 380 provided between the heating portion 330 and the cooling and conveying portion 340 detects the atmospheric temperature in the thermal development portion 360, and a signal showing the detected temperature from the temperature detecting member 380 is inputted into the control unit 390 (Step S201), the control unit 390 judges whether the detected temperature is within a predetermined temperature range or not (Stet S202). Then, when the control unit 390 judges that the detected temperature is within the predetermined temperature range (Step S202; Yes), it returns to Step S201. On the other hand, when the control unit 390 judges that the detected temperature is in the outside of the predetermined temperature range (Step S202; No), it stops the processing operation of the thermal development portion 360 (Step S203).

Next, the control unit 390 judges whether the detected temperature is not less than a predetermined temperature or not (Step S204). In addition, the predetermined temperature here is preferable to be the upper limit temperature of the predetermined temperature range in Step S202.

When the control unit 390 judges that the detected temperature is less than the predetermined temperature (that is, it is not more than the lower limit temperature of the predetermined temperature range) (Step S204; No), the control unit 390 maintains the stop state of the processing operation until the detected temperature increases to within the predetermined temperature range. Then, when the temperature detecting member 380 detects the atmospheric temperature in the thermal development portion 360, and a signal showing the detected temperature from the temperature detecting member 380 is inputted into the control unit 390 (Step S205), the control unit 390 judges whether the detected temperature is within the predetermined temperature range or not (Step S206). When the control unit 390 judges that the detected temperature is not within the predetermined temperature range (Step S206; No), it returns to Step S205. On the other hand, when the control unit 390 judges that the detected temperature is within the predetermined temperature range (Step S206; Yes), it cancels the stop of the processing operation of the thermal development portion 360 (Step S207). Then, it restarts the processing operation of the image forming apparatus 300, and returns to Step S201.

On the other hand, when the control unit 390 judges that the detected temperature is not less than the predetermined temperature (Step S204; Yes), the control unit 390 actuates the air blowing member 345 (Step S208). Next, the temperature detecting member 380 detects the atmospheric temperature in the thermal development portion 360, and a signal showing the detected temperature from the temperature detecting member 380 is inputted into the control unit 390 (Step S209). Then, the control unit 390 judges whether the detected temperature is within the predetermined temperature range or not (Step S210). When the control unit 390 judges that the detected temperature is within the predetermined temperature range (Step S210; No), it returns to Step S209. On the other hand, when the control unit 309 judges that the detected temperature is within the predetermined temperature range (Step S210; Yes), the control unit 390 stops the operation of the air blowing member 345 (Step S211), and cancels the stop of the processing operation of the thermal development portion 360 (Step S212). Then, it restarts the processing operation of the image forming apparatus 300, and returns to Step S201.

Thus, in the image formation apparatus 300, when the temperature of a predetermined portion in the image forming apparatus 300 detected by the temperature detecting member 380 is in the outside of a predetermined temperature range, the processing operation of the thermal development portion 360 is stopped. Then, when the temperature of the predetermined portion in the image forming apparatus 300 becomes within the predetermined temperature range, the stop of the processing operation of the thermal development portion 360 is cancelled, and the processing operation of the image forming apparatus 300 can be performed. Therefore, processing operation in a temperature range suitable for performing stable thermal development processing can be performed.

Further, when the temperature of a predetermined portion in the image forming apparatus 300 detected by the temperature detecting member 380 is not less than a predetermined temperature, the air blowing member 345 is actuated during the stop of the processing operation of the thermal development portion 360, and the cooling operation is performed so that the temperature of the predetermined portion in the image forming apparatus 300 will become within a predetermined temperature range. Then, when the temperature becomes within the predetermined temperature range, the stop of the processing operation of the thermal development portion 360 can be cancelled and the operation of the air blowing member 345 can be stopped. Therefore, processing operation at a temperature range suitable for performing stable thermal development processing can be performed.

[Fifth Embodiment]

Next, the operation in a fifth embodiment of the present invention will be explained along a flowchart shown in FIG. 12. In addition, since the construction of the image forming apparatus 300 is the same as in the third embodiment, the explanation is omitted.

Figure 12:
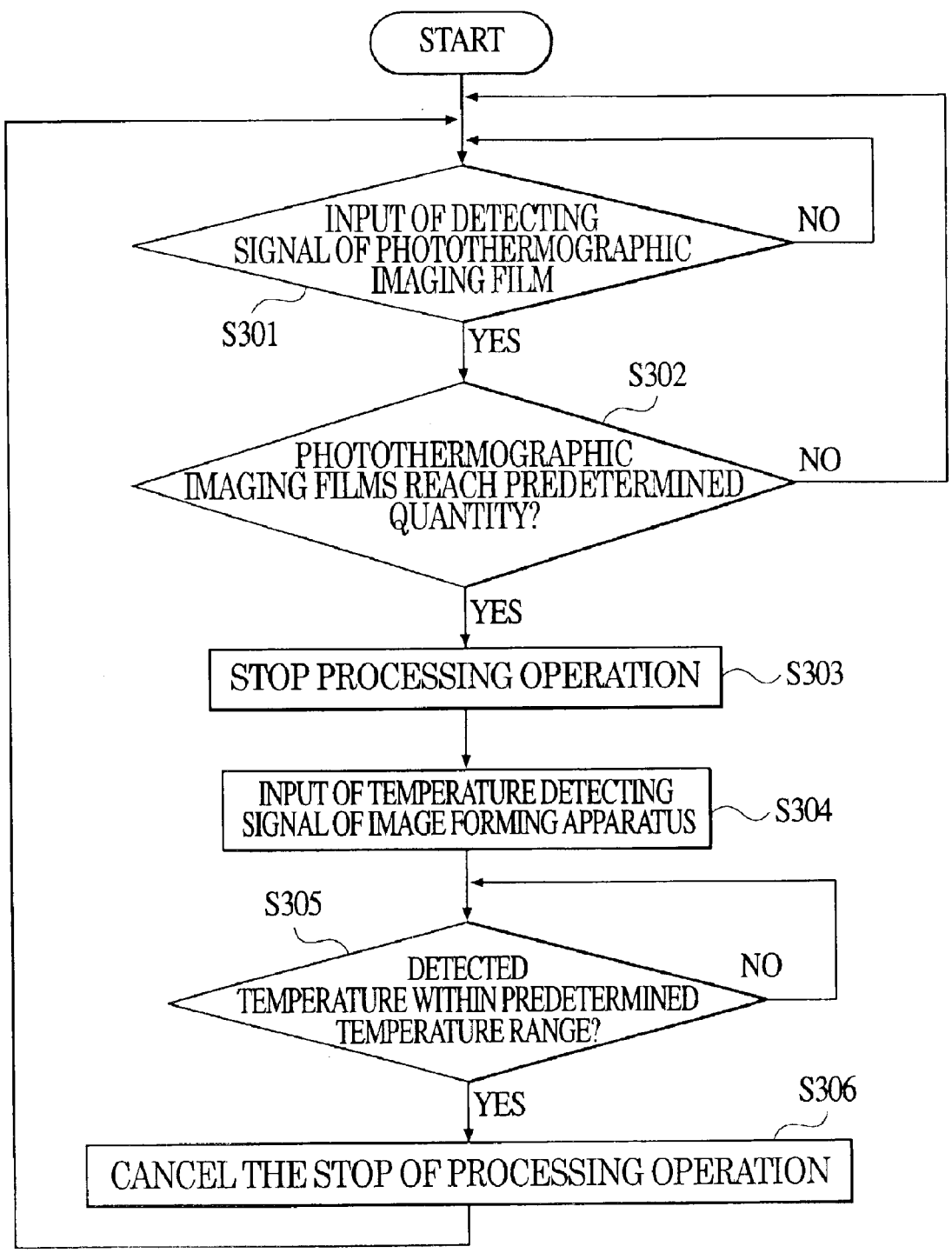
FIG. 12 is a flow chart showing an operation of the fifth embodiment of the present invention.

In FIG. 12, during the use of the image forming apparatus 300, when the detecting member 370 detects the thermally developed films F, and a signal showing the detection of the films F from the detecting member 370 is inputted into the control unit 390 (Step S301; Yes), it proceeds to Step S302. Next, the control unit 390 judges whether the detected films F have reached a predetermined number or not (Step S302). Then, when the control unit 390 judges that the detected films have not reached the predetermined number (Step S302; No), it returns to Step S301. On the other hand, when the control unit 390 judges that the detected film F have reached the predetermined number (Step S302; Yes), it stops the processing operation of the thermal development portion 360 (Step S303).

Next, when a signal showing the detected temperature from the temperature detecting member 380 is inputted into the control unit 390 (Step S304), the control unit 390 judges whether the detected temperature is within a predetermined temperature range or not (Step S305). When the control unit 390 judges that the detected temperature is within the predetermined temperature (Step S305; No), it returns to Step S304. On the other hand, when the control unit 390 judges that the detected temperature is within the predetermined temperature range (Step S305; Yes), it cancels the stop of the processing operation of the thermal development portion 360 (Step S306). Then, it restarts the processing operation of the image forming apparatus 300, and returns to Step S301.

Thus, in the image forming apparatus 300, when a predetermined number of the thermally developed films F is detected by the detecting member 370, the processing operation of the thermal development portion 360 is stopped for a predetermined time. Therefore, the films F not less than the predetermined number cannot be processed continuously. Accordingly, an extreme temperature variation in the image forming apparatus 300 according to continuous processing can be prevented. Therefore, the temperature difference in thermal development processing, the difference in processing condition can be eliminated, so that the density difference of the thermally developed films F can be prevented from being caused. Thereby, stable thermal development processing can be performed.

Further, the temperature of the predetermined portion in the image forming apparatus 300 that is detected by the temperature detecting member 380 becomes within the predetermined temperature range, the stop of the processing operation of the thermal development portion 360 is cancelled, and the processing operation of the image forming apparatus 300 can be performed. Therefore, processing operation in a temperature range suitable for performing stable thermal development processing.

Thus, as explained in the third to fifth embodiments, the processing operation of the thermal development portion 360 is stopped temporarily on the basis of the detection of the number of the films F by the detecting member 370 or the detection of the temperature of a predetermined portion in the image forming apparatus 300 by the temperature detecting member 380. The temperature variation in the inside of the image forming apparatus 300 can be suppressed by not making the processing operation being performed continuously according to this temporary stop. Thereby, density difference in thermal development according to temperature difference in processing can be prevented from being caused.

Here, in case that the films F in the third to fifth embodiments are thermally developed continuously, when the thermal mass supplied from the thermal development drum 331 of the facing rollers 332 is smaller than the thermal mass supplied from the facing rollers 332 to the films F thermally developed from a front end of the first film F is fed into the thermal development portion 360 until a front end of the second film F is fed into the thermal development portion 360, the temperature of the facing rollers 332 decreases. However, the temperature of the facing rollers 332 in the heating portion 330 in the image forming apparatus 300 is kept in a predetermined range by the above-mentioned control operation. Thereby, thermal development processing such that the density of the thermally developed films F is stabilized within a predetermined range can be performed.

Further, in case that the films F are thermally developed continuously, when the thermal mass radiated from the cooling and conveying portion 340 to the outside of the image forming apparatus 300 is smaller than the thermal mass radiated from the films F thermally developed from a front end of the first film F is fed into the cooling and conveying portion 340 until a front end of the second film F is fed into the cooling and conveying portion 340, to the cooling and conveying portion 340, the temperature in the cooling and conveying portion 340 increases. However, the temperature in the cooling and conveying portion 340 of the image forming apparatus 300 is kept in a predetermined range by the above-mentioned control operation. Thereby, the thermal development processing such that the density of the thermally developed films F is stabilized within a predetermined range can be performed.

Figure 13:
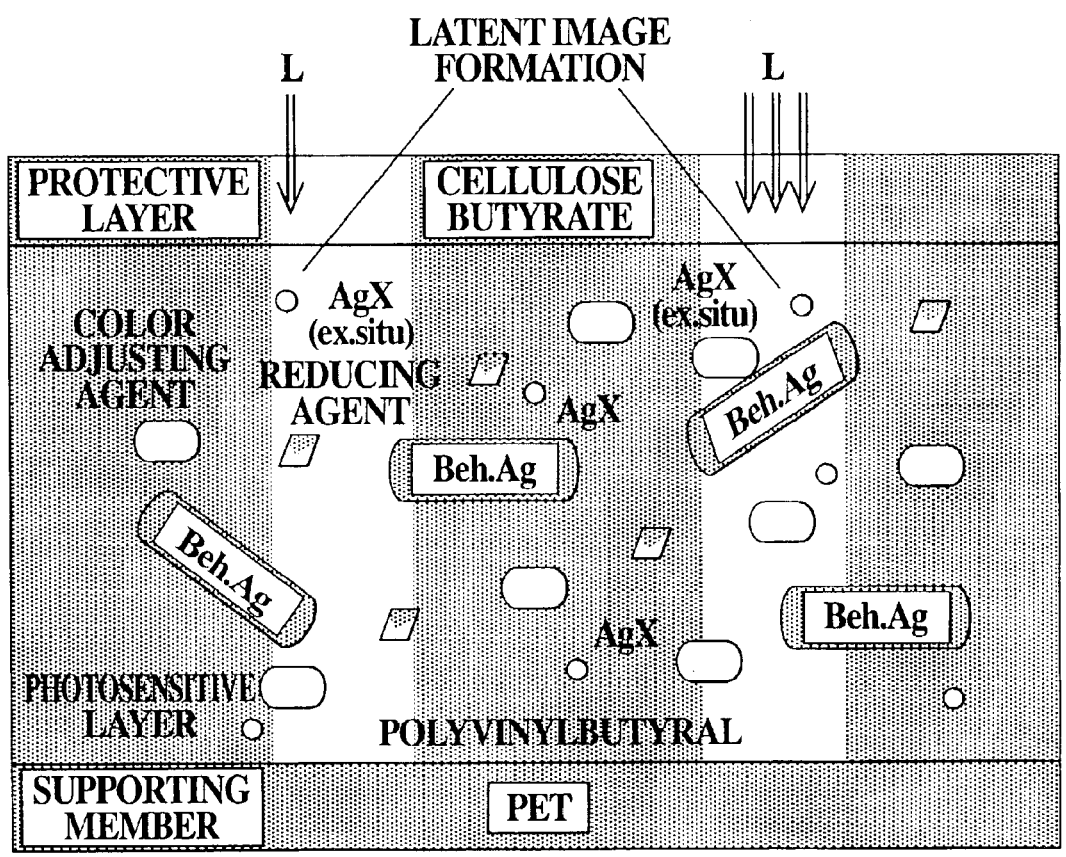
FIG. 13 is a cross sectional view showing a film in the embodiments of the present invention, and is a view schematically showing chemical reaction in the film when a laser beam is exposed from the exposure portion.

Further, in the first to fifth embodiments, the films F are conveyed to the sub-scanning portions 127, 225 and 325, and the latent image is formed on the whole surface of the films F, which is from the front end to the rear end, on the basis of the image signal from the outside. Thereby, image forming is performed. The formation of the latent image on the film F will be explained by FIG. 13. FIG. 13 is a cross sectional view showing the film F in the embodiments of the present invention, and is a view schematically showing chemical reaction in the film F at the time of exposure as mentioned above.

The film F comprises a supporting member (base layer) made from PET, a photosensitive layer whose main material is polyvinylbutyral, the photosensitivity layer being formed on the supporting member, and a protective layer made from cellulose butyrate, the protective layer being formed on the photosensitive layer. Photosensitive halide particles, silver behenate (Beh. Ag), which is an organic acids, and silver ionic reducing agents are included in the photosensitive layer, and color adjusting agents are combined in order to improve the development characteristic, the maximum density, and the color tone of the latent image.

At the time of exposure, when the laser beam L is irradiated to the film F from each of the exposure portions 120, 220 and 320, the silver halide particles in the region where the laser beam L is irradiated sensitize the light, so that a latent image is formed, as shown in FIG. 13.

Next, the film F on which the latent image is formed is conveyed to the heating portions 130, 230 and 330 of the thermal development portions 160, 260 and 360 by a plurality of conveying roller pairs 102, 202 and 303, respectively. In the heating portions 130, 230 and 330, the film F is thermally developed by being heated at a predetermined temperature, for example, between 115° C. and 135° C., by the thermal development drums 131, 231 and 331, respectively. Thereafter, the film F is cooled and conveyed at each of the cooling and conveying portions 140, 240 and 340. Moreover, the film F is conveyed to each of the film outputting portions 150, 250 and 350 and outputted to the outside of the apparatuses.

Figure 14:
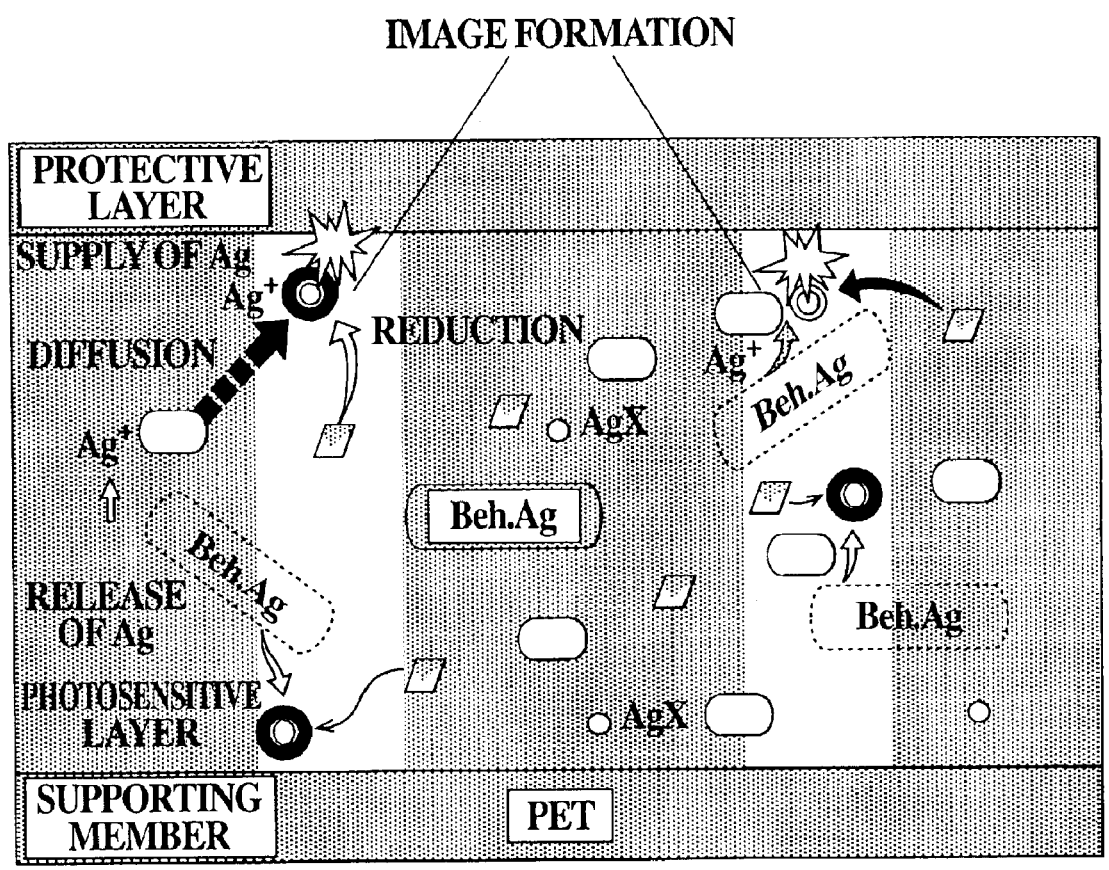
FIG. 14 is a cross sectional view showing the film in the embodiments of the present invention, and is a view schematically showing chemical reaction in the film when the film on which a latent image is formed as shown in FIG. 13 is heated.

FIG. 14 is the same cross sectional view as FIG. 13 schematically showing chemical reaction in the film F at the time of heating as mentioned above. The film F is not thermally developed substantially at the temperature not more than 40° C., and is thermally developed when the film F is heated at the development temperature not less than the critical development temperature as mentioned above. This seems that, as shown in FIG. 14, the silver ions ($Ag^+$) are released from the silver behenate, and the behenic acid, which has released the silver ions, forms a complex with the color adjusting agents, and that the diffusing capacity of the silver ions becomes high, and the silver halide particles are also diffused, and that the silver ions are diffused thereafter, and that the reducing agents act by using the sensitized silver halide particles as a core, and that a latent image is formed by chemical reaction.

In the above, the embodiments of the present invention are explained. However, it is needless to say that the present invention is not limited to such embodiment, but various modifications are possible in a range within the scope of the present invention. For example, in the embodiments, the light source is laser source. However, it may be a light emitting diode (LED). Further, the construction of the exposure portions, the thermal development drums, the facing rollers and the like is arbitrary, and it is needless to say that the other concrete detailed structure and the like can be modified appropriately. Moreover, the various temperatures shown in the embodiments of the present invention are not limited to them since they vary according to the construction, processing conditions of the apparatus, kinds of films F or the like.

Further, in the above-mentioned embodiments, the variation of the image density is suppressed by detecting the temperature in the vicinity of the exposure portion or in a predetermined portion in the thermal development portion and by controlling the development time of the film in the thermal development drum (the rotating speed of the thermal development drum). However, the present invention is not limited to this. For example, the development temperature may be controlled in accordance with the detected temperature. Concretely, the electric power used for the heat source in the thermal development drum may be controlled in accordance with the detected temperature.

Moreover, in the second embodiment, the temperature in the vicinity of the exposure portion 220 is detected by providing the temperature sensor of the exposure portion 271. However, the electric energy energized to the semiconductor laser within the recent predetermined time may be detected. Further, the temperature of the surface of the metal of the guide plate 241 in the cooling and conveying portion 240 is detected by providing the temperature sensor of the cooling and conveying portion 272. However, the area or the number of films F that have passed the cooling and conveying portion 240 within the recent predetermined time, or the like, may be detected.

Further, in the third embodiment, the quantitative processing history is the number of films F, and the detecting member 370 detects the number of the films F. However, the present invention is not limited to this. The detecting member 370 may detect the size of the film F, or the processing area according to the size and the number of films F, as the quantitative processing history.

Moreover, in the third embodiment, the control unit 390 performs the control on the basis of the number of thermally developed films F detected by the detecting member 370. However, the present invention is not limited to this. It may be the control on the basis of thermal mass, energy or the like supplied to the thermally developed films F, taking the heat capacity of the films F to the number (quantity) or processing area of the films F into consideration. In addition, the heat capacity is the thermal mass required for changing the temperature of a substance for 1° C. It is (mass)× (specific heat) of the substance.

Further, in the third to fifth embodiments, the control operation and the processing operation of the control unit 390 of the image forming apparatus 300 are explained individually as each embodiment. However, it may be performed as the control operation and processing operation in which control operation and processing operation are compounded, respectively.

Moreover, the portion that each temperature sensor or detecting member is provided is not limited particularly. It is arbitrary. In particular, the temperature sensor in the thermal development portion is preferable to be provided in the portion that shows the rate of temperature variation close to the temperature variation of the real film according to the thermal development. For example, the temperature sensor 170 in the first embodiment is for detecting the temperature of the space under the guide plate 141 in the cooling and conveying portion 140. However, it may be for detecting the temperature of the space above the guide plate 141. Further, it may be for detecting the temperature of the film F itself that is sent from the heating portion 130 to the cooling and conveying portion 140. In this case, an infrared ray temperature sensor, thermoviewer or the like may be used preferably. The temperature of the film F may be measured in both contact and non-contact. In addition, in this case, holes or slits for temperature detecting may be provided on the guide plate 141. Further, the temperature sensor 170 may be for detecting the temperature of the guide plate 141. That is, the temperature sensor may be provided in a portion (such as, atmosphere, guide plate or the like) that the increase and decrease of the temperature has a predetermined relation with the temperature of the film F sent from the heating portion 130. When the temperature is detected from the member which is in contact with the film F, such as the guide plate 141 or the like, it is preferable since it becomes faithful to the effect of the temperature received by the film F.

In the second to fifth embodiments, the same modification is possible with respect to each temperature sensor. That is, the portion of the temperature sensor in the thermal development portion for detecting temperature is arbitrary, such as, various such as facing rollers, guide plate or the like, atmosphere in the heating portion, atmosphere in the cooling and conveying portion. Further, it is not limited to one portion. It may be provided in a plurality portions.

In addition, the "environmental temperature" in the present specification means the temperature, such as a room or the like in which the image forming apparatus is installed. Further, the "atmospheric temperature" means the temperature of the space in the apparatus.

The entire disclosure of Japanese Patent Application No. 2001-393503 filed on Dec. 26, 2001, Japanese Patent Application No. 2001-397284 filed on Dec. 27, 2001, and Japanese Patent Application No. 2002-089038 filed on Mar. 27, 2002 including specification, claims, drawings and summary are incorporated herein by reference in its entirety.

What is claimed is:

1. An image forming apparatus comprising:
   an exposure portion having a light source, for forming a latent image on a photothermographic imaging material by exposing a light beam to the photothermographic imaging material from the light source;
   a thermal development portion having a heating portion for thermally developing the photothermographic imaging material on which the latent image is formed, by heating, and a cooling and conveying portion for conveying and cooling the thermally developed photothermociraphic imaging material;
   a temperature detecting member for detecting at least one of a temperature of a predetermined portion concerning the cooling and conveying portion and a temperature in a vicinity of the exposure portion; and
   a control unit for controlling a factor relating to thermal development on a basis of the temperature detected by the temperature detecting member,
   wherein the control unit makes an operation stop when the temperature detected by the temperature detecting member is outside of a predetermined range, and
   wherein the control unit makes the operation restart when a time that the operation is stopped exceeds a predetermined time.

2. An image forming apparatus comprising:
   an exposure portion having a light source, for forming a latent image on a photothermographic imaging material by exposing a light beam to the photothermographic imaging material from the light source;
   a thermal development portion having a heating portion for thermally developing the photothermographic imaging material on which the latent image is formed, by heating, and a cooling and conveying portion for conveying and cooling the thermally developed photothermographic imaging material;
   a temperature detecting member for detecting at least one of a temperature of a predetermined portion concerning the cooling and conveying portion and a temperature in a vicinity of the exposure portion;
   a control unit for controlling a factor relating to thermal development on a basis of the temperature detected by the temperature detecting member; and
   a detecting member for detecting a quantitative processing history of the photothermographic imaging material thermally developed in the thermal development portion.

3. The apparatus of claim 2, wherein the control unit controls the factor relating to thermal development on a basis of the temperature detected by the temperature detecting member and the quantitative processing history detected by the detecting member.

4. The apparatus of claim 3, wherein the control unit makes an operation stop when the quantitative processing history exceeds a predetermined quantity.

5. The apparatus of claim 4, wherein the control unit controls at least one of a development time and a development temperature in the thermal development portion until the quantitative processing history reaches the predetermined quantity.

6. The apparatus of claim 4, wherein the control unit makes the operation restart when a time that the operation is stopped exceeds a predetermined time.

7. The apparatus of claim 4, wherein the control unit makes the operation restart when the temperature detected by the temperature detecting member is within a predetermined range.

8. An image forming method comprising:
forming a latent image on a photothermographic imaging material by exposing a light beam to the photothermographic imaging material from a light source;
thermal development including heating for thermally developing the photothermographic imaging material on which the latent image is formed, by heating, and cooling and conveying the thermally developed photothermographic imaging material;
detecting at least one of a temperature concerning the cooling and conveying and a temperature in the forming of the latent image; and
controlling a factor relating to thermal development on a basis of the detected temperature;
wherein the controlling includes stopping an operation when the detected temperature is outside of a predetermined range, and
wherein the controlling includes restarting the operation when a time that the operation is stopped exceeds a predetermined time.

9. An image forming method comprising:
forming a latent image on a photothermographic imaging material by exposing a light beam to the photothermographic imaging material from a light source;
thermal development including heating for thermally developing the photothermographic imaging material on which the latent image is formed, by heating, and cooling and conveying the thermally developed photothermographic imaging material;
detecting at least one of a temperature concerning the cooling and conveying and a temperature in the forming of the latent image;
controlling a factor relating to thermal development on a basis of the detected temperature; and
detecting a quantitative processing history of the photothermographic imaging material thermally developed in the thermal development.

10. The method of claim 9, wherein the controlling includes controlling the factor relating to thermal development on a basis of the detected temperature and the detected quantitative processing history.

11. The method of claim 10, wherein the controlling includes stopping an operation when the quantitative processing history exceeds a predetermined quantity.

12. The method of claim 11, wherein the controlling includes controlling at least one of a development time and a development temperature in the thermal development until the quantitative processing history reaches the predetermined quantity.

13. The method of claim 11, wherein the controlling includes restarting the operation when a time that the operation is stopped exceeds a predetermined time.

14. The method of claim 11, wherein the controlling includes restarting the operation when the detected temperature is within a predetermined range.

15. An image forming apparatus comprising:
an exposure portion having a light source, for forming a latent image on a photothermographic imaging material by exposing a light beam to the photothermographic imaging material from the light source;
a thermal development portion having a heating portion for thermally developing the photothermographic imaging material on which the latent image is formed, by heating, and a cooling and conveying portion for conveying and cooling the thermally developed photothermographic imaging material;
a detecting member for detecting a quantitative processing history of the photothermographic imaging material thermally developed in the thermal development portion; and
a control unit for controlling a factor relating to thermal development on a basis of the quantitative processing history detected by the detecting member.

16. The apparatus of claim 15, wherein the light source is one of a semiconductor laser and a light emitting diode.

17. The apparatus of claim 15, wherein the control unit makes an operation stop when the quantitative processing history exceeds a predetermined quantity.

18. The apparatus of claim 17, wherein the control unit makes the operation restart when a time that the operation is stopped exceeds a predetermined time.

19. The apparatus of claim 15, further comprising: a temperature detecting member for detecting at least one of a temperature of a predetermined portion in the thermal development portion and a temperature in a vicinity of the exposure portion.

20. The apparatus of claim 19, wherein the cooling and conveying portion comprises a guiding member for guiding the photothermographic imaging material, and the temperature of the predetermined portion in the thermal development portion is one of a temperature of the thermally developed photothermographic imaging material, an atmospheric temperature in the cooling and conveying portion, a temperature of the guiding member in the cooling and conveying portion, and an atmospheric temperature between the heating portion and the cooling and conveying portion, and the temperature in the vicinity of the exposure portion is one of an atmospheric temperature in the vicinity of the exposure portion and a temperature of a member in the vicinity of the exposure portion.

21. The apparatus of claim 20, wherein the guiding member comprises a guiding surface for guiding the photothermographic imaging material, and a heat insulation member is provided on the guiding surface.

22. The apparatus of claim 15, wherein the thermal development portion further comprises an air blowing member for cooling the thermal development portion by cooling air.

23. The apparatus of claim 15, wherein the thermal development portion further comprises an air blowing member, and the air blowing member cools the thermal development portion by cooling air when the operation is stopped.

24. The apparatus of claim 15, wherein the thermal development portion further comprises a deodorizing member for removing gas generated when the photothermographic imaging material is thermally developed.

25. An image forming method comprising:
forming a latent image on a photothermographic imaging material by exposing a light beam to the photothermographic imaging material from the light source;

thermal development including heating for thermally developing the photothermographic imaging material on which the latent image is formed, by heating, and a cooling and conveying the thermally developed photothermographic imaging material;

detecting a quantitative processing history of the photothermographic imaging material thermally developed in the thermal development portion; and controlling a factor relating to thermal development on a basis of the detected quantitative processing history.

26. The method of claim 25, wherein the light source is one of a semiconductor laser and a light emitting diode.

27. The method of claim 25, wherein the controlling includes stopping an operation when the quantitative processing history exceeds a predetermined quantity.

28. The method of claim 27, wherein the controlling includes restarting the operation when a time that the operation is stopped exceeds a predetermined time.

29. The method of claim 25, further comprising: detecting at least one of a temperature in the thermal development and a temperature in the forming of the latent image.

30. The method of claim 29, wherein the thermally developed photothermographic imaging material is conveyed by a guiding member and the exposure is carried out by an exposure portion, and the temperature in the thermal development is one of a temperature of the thermally developed photothermographic imaging material, an atmospheric temperature in the cooling and conveying, a temperature of the guiding member, and an atmospheric temperature between the heating and the cooling and conveying, and the temperature in the forming of the latent image is one of an atmospheric temperature in a vicinity of the exposure portion and a temperature of a member in the vicinity of the exposure portion.

31. The method of claim 30, wherein the guiding member comprises a guiding surface for guiding the photothermographic imaging material, and a heat insulation member is provided on the guiding surface.

32. The method of claim 25, further comprising: blowing cooling air for cooling a temperature in the thermal development.

33. The method of claim 25, further comprising: blowing cooling air for cooling a temperature in the thermal development, the cooling being performed when the operation is stopped.

34. The method of claim 25, further comprising: removing gas generated when the photothermographic imaging material is thermally developed.

* * * * *